US012284988B1

(12) United States Patent
Van Delden et al.

(10) Patent No.: US 12,284,988 B1
(45) Date of Patent: Apr. 29, 2025

(54) MULTI-PURPOSE FEEDER WITH TIMED ACCESS CONTROL SYSTEM

(71) Applicants: Timothy K Van Delden, New Braunfels, TX (US); Robert E O'Connor, San Antonio, TX (US)

(72) Inventors: Timothy K Van Delden, New Braunfels, TX (US); Robert E O'Connor, San Antonio, TX (US)

(73) Assignee: Next Generation Deer Feeders, New Braunfels, TX (US)

( * ) Notice: Subject to any disclaimer, the term of this patent is extended or adjusted under 35 U.S.C. 154(b) by 0 days.

(21) Appl. No.: 18/958,350

(22) Filed: Nov. 25, 2024

Related U.S. Application Data

(63) Continuation-in-part of application No. 18/650,428, filed on Apr. 30, 2024, now Pat. No. 12,150,432.

(51) Int. Cl.
*A01K 5/02* (2006.01)

(52) U.S. Cl.
CPC .......... *A01K 5/0291* (2013.01); *A01K 5/0225* (2013.01)

(58) Field of Classification Search
CPC .. A01K 5/0291; A01K 5/0225; A01M 31/008
USPC ...................................................... 119/51.11
See application file for complete search history.

(56) References Cited

U.S. PATENT DOCUMENTS

| | | | | |
|---|---|---|---|---|
| 2,638,871 A | * | 5/1953 | Ruedemann ......... | A01K 5/0225 52/194 |
| 2,974,634 A | * | 3/1961 | Williams ............. | A01K 5/0225 119/53 |
| 3,195,508 A | | 7/1965 | Lehman | |
| 3,405,684 A | * | 10/1968 | Ott ....................... | A01K 5/0225 119/59 |
| 4,235,200 A | | 11/1980 | Shay | |
| 4,491,086 A | | 1/1985 | Croteau | |
| 4,722,300 A | | 2/1988 | Walker | |
| 5,050,770 A | | 9/1991 | Smiley | |

(Continued)

FOREIGN PATENT DOCUMENTS

WO WO-2017192957 A1 * 11/2017

OTHER PUBLICATIONS

Electriduct Stainless Steel Braided Sleeving (https://www.amazon.com/Electridct-Stainless-Steel-Braided-Sleeving/dp/B007KA7FZG?th=1) (Year: 2012).*

(Continued)

*Primary Examiner* — Timothy D Collins
*Assistant Examiner* — Maria E Graber
(74) *Attorney, Agent, or Firm* — Clearpat Services, LLC; Brian Burkinshaw

(57) ABSTRACT

A multi-purpose gravity-fed feeder system comprising a timed-access control system configured to simultaneously provide a combination of different nutrient-rich feed attractants to a target animal at a feeder site during specific hours, the timed-access control system comprising a synchronizing actuator control board with LCD interface, linear actuators, two or more actuator push-pull arms, an actuator tower with assembly mount, a solar panel and charge controller. The feed storage system comprises at least one feed access control door assembly, a dividable hopper with a removeable baffle configured to separate the different nutrient, protein-rich feed attractants and feed metering devices.

11 Claims, 16 Drawing Sheets

(56) References Cited

U.S. PATENT DOCUMENTS

| | | | | |
|---|---|---|---|---|
| 6,050,016 | A * | 4/2000 | Cox | A01M 31/008 43/1 |
| 6,779,487 | B1 | 8/2004 | Kochan | |
| 8,096,265 | B1 * | 1/2012 | Wisecarver | A01K 5/0225 119/56.2 |
| 8,555,812 | B2 * | 10/2013 | Nowacek | A01K 5/02 119/61.2 |
| 8,651,053 | B2 * | 2/2014 | Reid | A01K 5/0291 119/52.1 |
| 9,743,641 | B1 | 8/2017 | Attard | |
| 10,093,298 | B2 * | 10/2018 | Kipp | B64C 25/44 |
| 10,104,868 | B2 * | 10/2018 | Barney | A01K 5/0275 |
| 10,292,363 | B2 * | 5/2019 | Monk | A01K 5/02 |
| 10,506,793 | B2 * | 12/2019 | Zuidhof | A01K 5/02 |
| 10,548,295 | B2 * | 2/2020 | Blevins | A01K 5/0291 |
| 10,810,527 | B2 * | 10/2020 | Lauve, IV | G06Q 10/06314 |
| 10,856,521 | B1 * | 12/2020 | Thorngren | G05B 19/042 |
| 11,284,602 | B2 * | 3/2022 | Griswold | A01K 5/0225 |
| 11,602,127 | B1 * | 3/2023 | Swicegood | A01K 5/0225 |
| 11,882,811 | B1 * | 1/2024 | Libsack | A01K 5/0291 |
| 12,004,491 | B1 * | 6/2024 | Van Delden | A01K 5/0291 |
| 12,150,432 | B1 | 11/2024 | Van Delden | |
| 2006/0070578 | A1 * | 4/2006 | Pavlik | A01K 5/01 119/51.11 |
| 2007/0181069 | A1 * | 8/2007 | Jack | A01K 5/01 119/61.1 |
| 2008/0029034 | A1 * | 2/2008 | Busbice | A01K 5/025 119/51.11 |
| 2009/0020074 | A1 * | 1/2009 | Harman | A01K 39/00 119/51.11 |
| 2009/0241840 | A1 | 10/2009 | Mills | |
| 2010/0242846 | A1 * | 9/2010 | Kolkovski | A01K 61/80 119/51.11 |
| 2010/0307421 | A1 | 12/2010 | Gates | |
| 2010/0307818 | A1 * | 12/2010 | Sturges | H02G 9/12 29/852 |
| 2013/0186342 | A1 | 7/2013 | Salinas | |
| 2014/0174368 | A1 * | 6/2014 | Salinas | A01K 5/0291 119/51.11 |
| 2018/0300662 | A1 * | 10/2018 | Lauve, IV | G06Q 10/1097 |
| 2021/0144960 | A1 * | 5/2021 | Taneja | A01K 7/027 |
| 2023/0020740 | A1 * | 1/2023 | Smith | A01K 29/005 |
| 2024/0240655 | A1 * | 7/2024 | Chauhan | F15B 15/26 |

OTHER PUBLICATIONS

Briidea Feeder Activator Remote Control (https://www.amazon.com/dp/B09KMPQLS9/ref=sspa_dk_rhf_search_pt_sub_0/?_encoding=UTF8&ie=UTF8&psc=1&sp_csd=d2lkZ2VOTmFtZT1zcF9yaGZfc2VhcmNoX3BlcnNvbmFsaXplZA%3D%3D&pd_rd_w=J2Mq0&content-id=amzn1.sym.74b85f4a-bfbe-49a3-8252-7e9927a19318&pf_rd_p=74b85f4a-bf)(2021) (Year: 2021).*

Polyethylene Chemical Resistance Chart, CDF Technical Memo (https://www.cdf1.com/technical%20bulletins/Polyethylene_Chemical_Resistance_Chart.pdf) (Year: 2004).*

Amazon.com Large Outdoor Electrical Box (Year: 2023)https://www.amazon.com/Flemoon-Electrical-Transparent-Waterproof-Weatherproof/dp/B0CJF8LDZP/ref=asc_df_B0CJF8LDZP?mcid=5e52537510c23f98aadc87903adf4420&hvocijid=3754652436940563521-B0CJF8LDZP-&hvexpln=73&tag=hyprod-20&linkCode=df0&hvadid=692875362841&hvpos=&hvnet.*

* cited by examiner

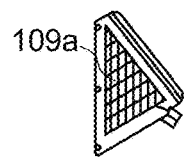 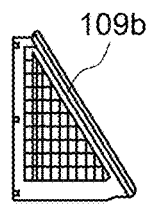 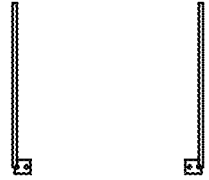 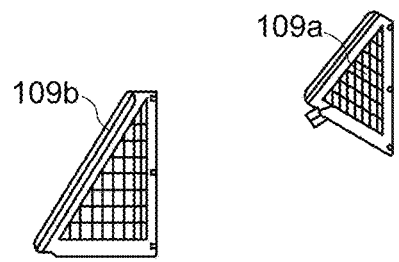
FIG. 2A    FIG. 2B
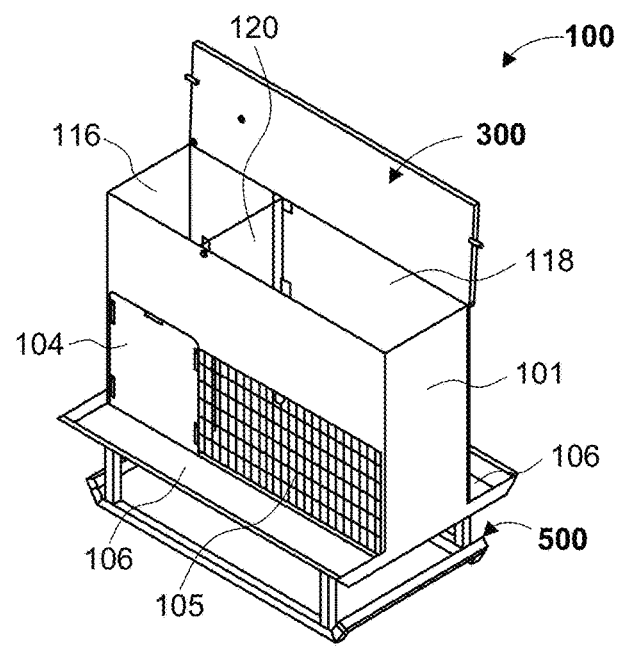
FIG. 3

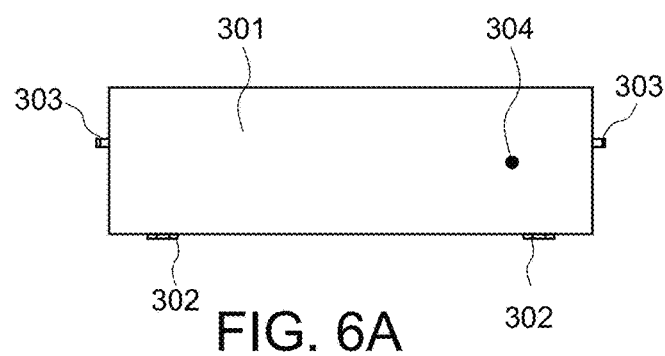
FIG. 6A
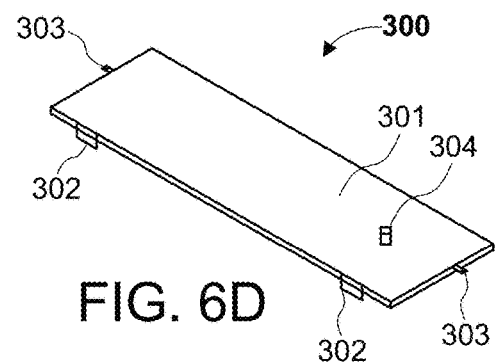
FIG. 6D
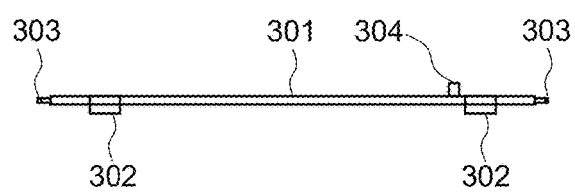
FIG. 6B
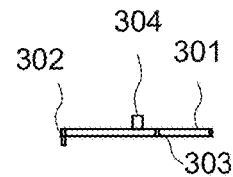
FIG. 6C
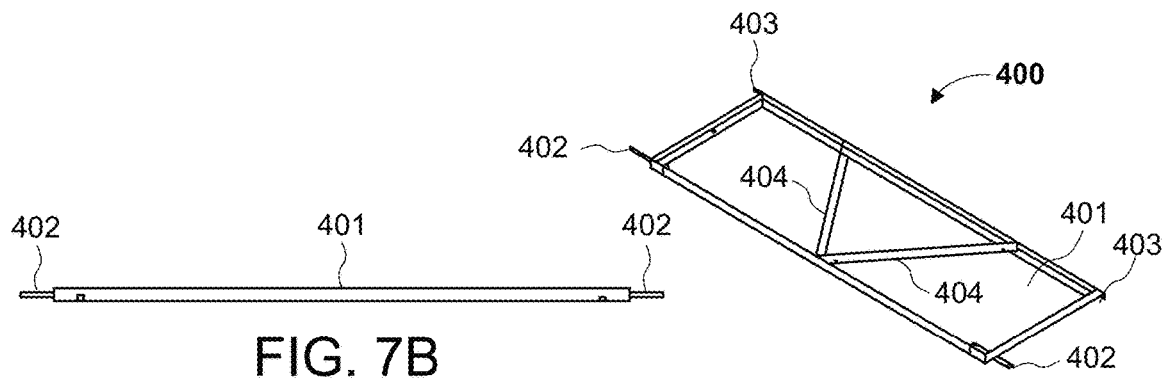
FIG. 7B
FIG. 7C
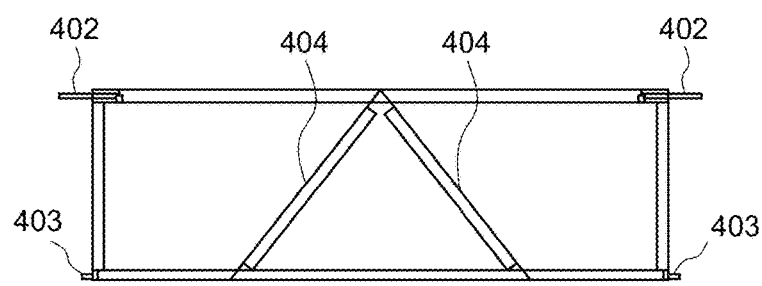
FIG. 7A

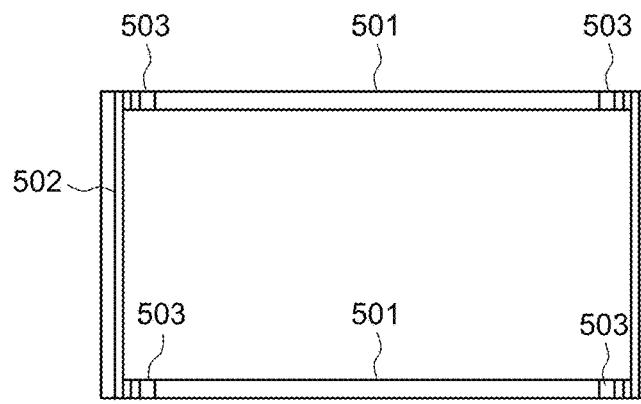
FIG. 8A
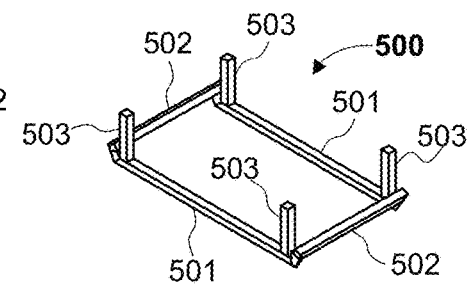
FIG. 8D
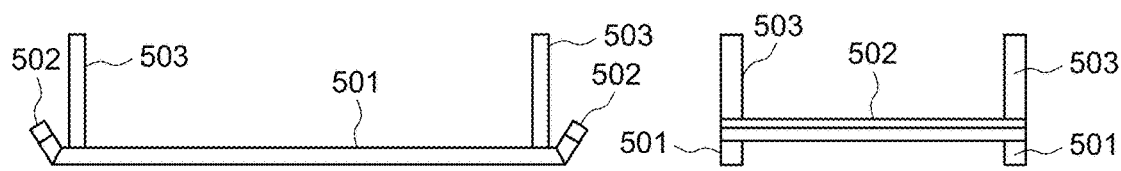
FIG. 8B
FIG. 8C
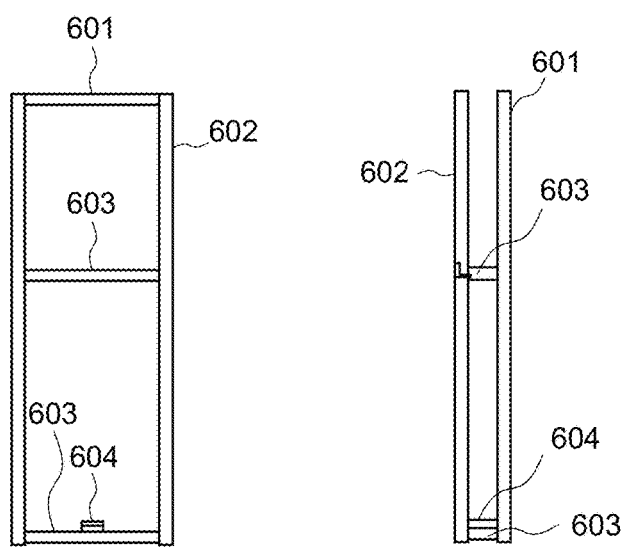
FIG. 9A
FIG. 9B
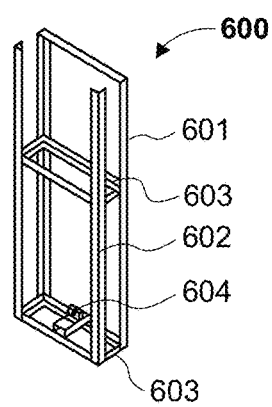
FIG. 9C

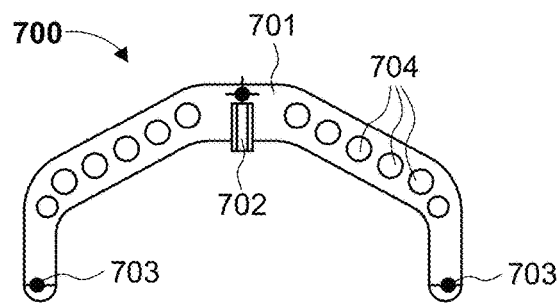
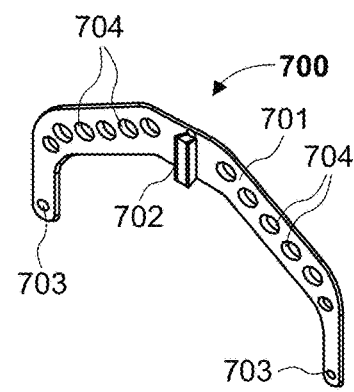
FIG. 10A     FIG. 10B     FIG. 10C
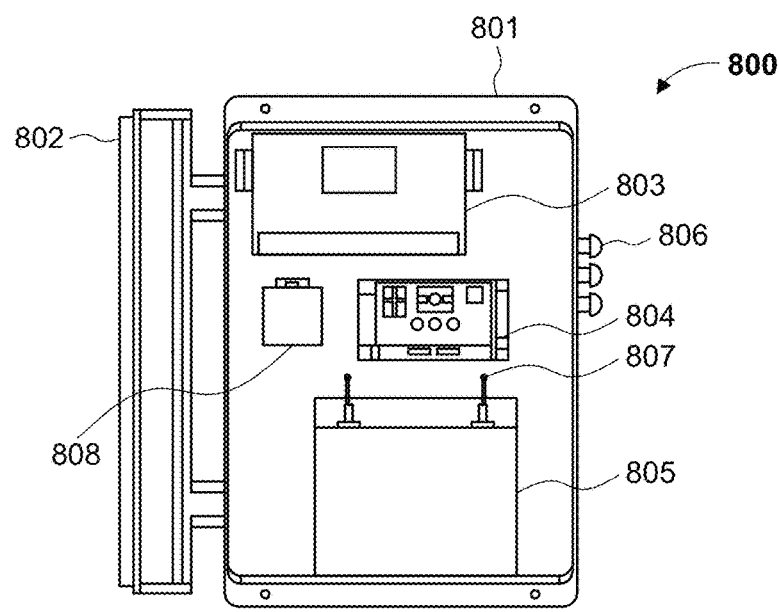
FIG. 11

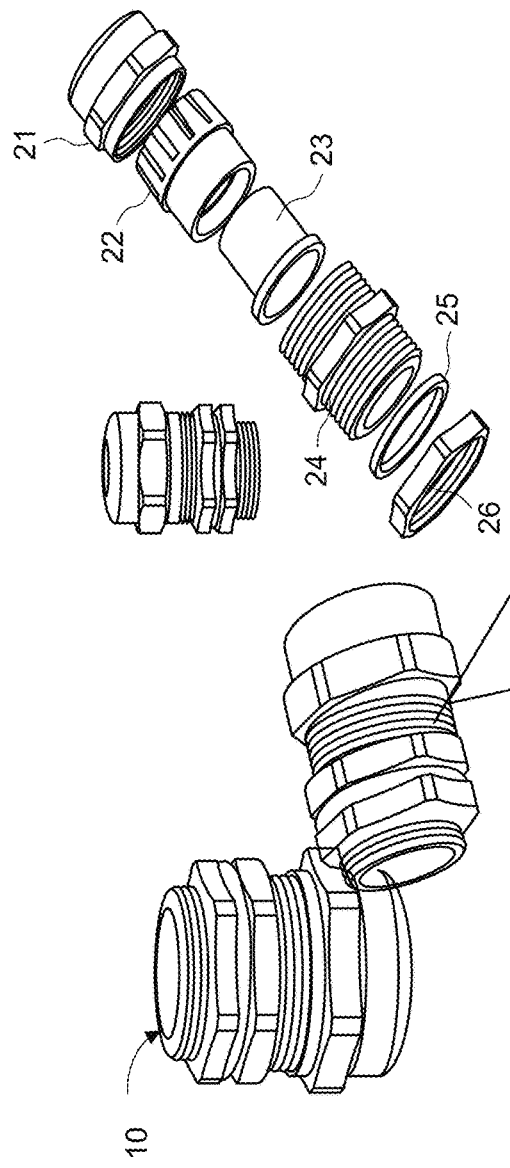
FIG. 14-A
FIG. 14-B
| MODEL | Cable Range mm(inch) | D1 mm(inch) | H1 mm(inch) | Spanner Size mm(inch) |
|---|---|---|---|---|
| NPT1/4" | 3-6.5 | 11.6 | 6.5 | 16 |
| NPT1/2" | 6-12 | 18.7 | 7.6 | 22 |
| NPT3/4" | 13-18 | 24.5 | 9 | 30 |
| NPT1" | 18-25 | 30.5 | 9.5 | 40 |
FIG. 14-C
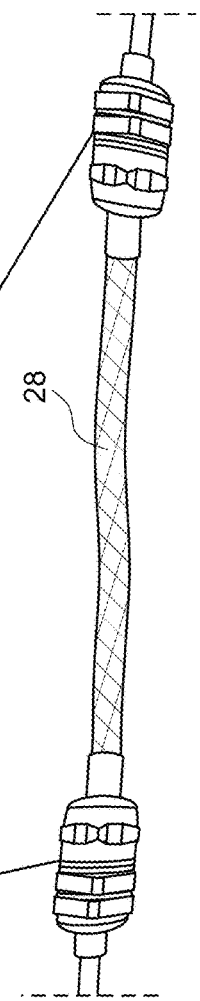
Cable gland
FIG. 14-D

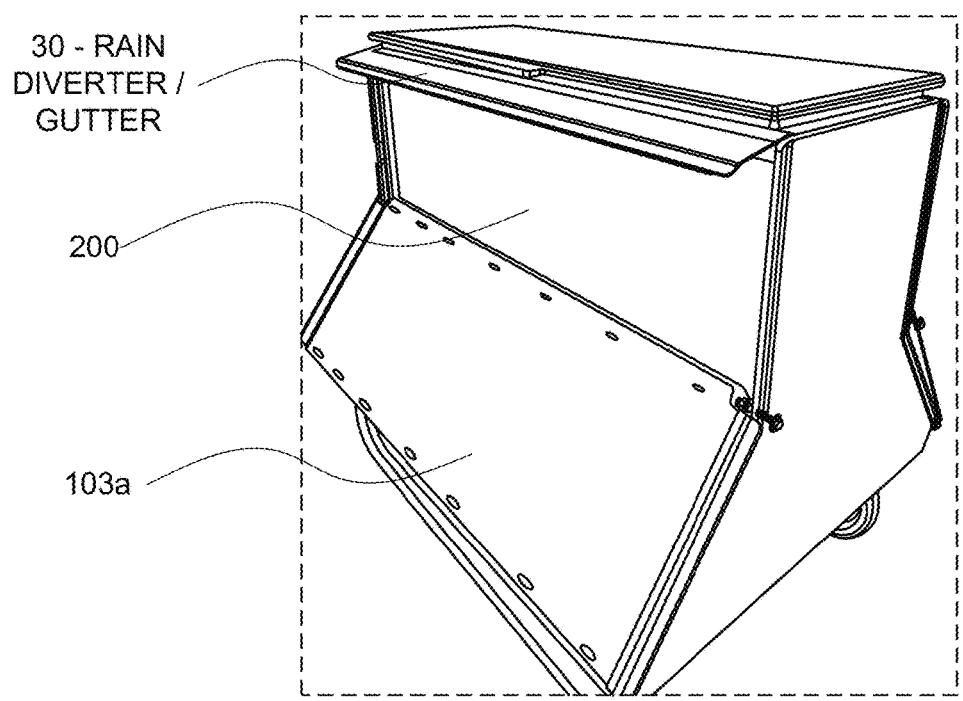
FIG. 15-A
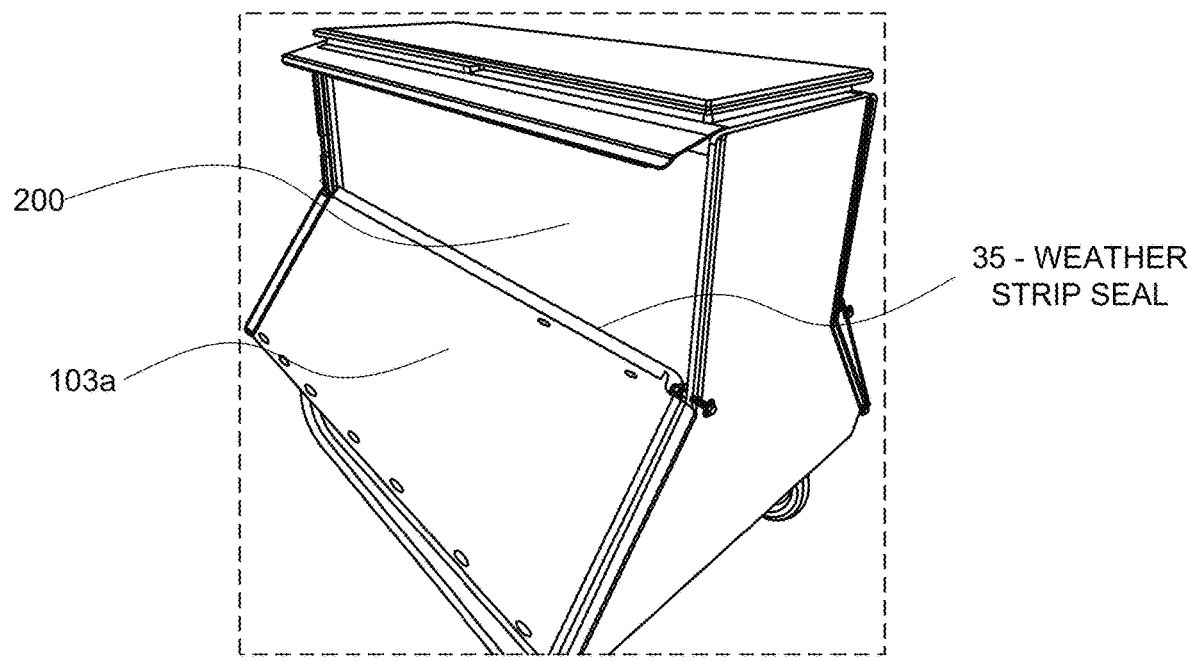
FIG. 15-B

MULTI-PURPOSE FEEDER WITH TIMED ACCESS CONTROL SYSTEM

CROSS-REFERENCE

This application is a continuation-in-part of Ser. No. 18/650,428, filed Apr. 30, 2024, now U.S. Pat. No. 12,150,432, issued Nov. 26, 2024, which is incorporated herein by reference in its entirety and to which application we claim priority under 35 USC § 120.

BACKGROUND

The present disclosure is generally directed to deer feeders and more specifically to a multi-purpose feeder with a timed-access control system as an improvement to existing gravity-fed feeders to increase the opportunities to attract and feed the target animal at the feeder site during legal hunting hours.

Supplemental feeders providing "fortified" nutritional feed are generally thought to provide an optional source of protein during off-season periods, particularly during summertime dry seasons when antler growth occurs.

SUMMARY

Provided herein is a multi-purpose gravity-fed feeder system configured to provide a combination of nutrient-rich feed attractant to a target animal at a feeder site during specific hours, said system comprising: a gravity-fed feed storage bin; at least one feed access control door assembly; at least one feed metering device; a timed-access control system comprising: an actuator control board (or actuator controller) with LCD interface; two or more linear actuators; two or more actuator push-pull arms; and actuator tower and assembly mount; wherein said gravity-fed feed storage bin comprises one or more dividable hoppers for storing and dispensing said combination of nutrient-rich feed attractant, wherein said at least one feed access control door assembly is configured for fixation to said feed storage bin and configurable to cover or uncover a feed tray on the feed storage bin, wherein said actuator push-pull arms are configured for fixation to said feed access control door assembly and further affixed to the linear actuators, wherein said actuator tower and assembly mount are affixed to the gravity-fed feed storage bin, configurable to hold and stabilize the linear actuators and actuator push-pull arms, and wherein said actuator controller with LCD interface is configurable to actuate the linear actuator to push or pull the actuator push-pull arms to open or close the feed access control door assembly at pre-set time intervals to allow a target animal access to said nutrient-rich feed attractant in said feed tray or the metering device configured to restrict excessive flow of feed from the storage feed bin on the feed storage bin.

In some embodiments, the timed-access control system further comprises a primary battery electrically connected to the timed-access control system; and the actuator controller with LCD interface electrically connected to the linear actuators.

In some embodiments of the timed-access control system, the primary battery is rechargeable.

In some embodiments of the timed-access control system, further comprises: a back-up battery; wherein said backup battery is configured to maintain memory settings of the actuator controller with LCD interface in the event power is lost from the primary battery, and wherein said backup battery is rechargeable.

In some embodiments, the timed-access control system further comprises: a solar panel electrically connected to the primary battery; and a solar panel charge controller electrically connected to the solar panel; wherein said solar panel and charge controller are configured to maintain and recharge the primary battery.

In some embodiments, the timed-access control system, said solar panel and charge controller are also configured to maintain and recharge the actuator controller backup battery.

In some embodiments of the timed-access control system, the actuator controller is configured to synchronously operate the two or more linear actuators.

In some embodiments of the timed-access control system, the actuator controller is configured with electromagnetic relays and a programmable timer. In other embodiments, the actuator controller is configured with a Printed Circuit Board (PCB) and configurable with multiple internal relays and timer(s).

In some embodiments, the actuator controller further comprises configuration settings to provide limit position adjustments for the linear actuators; speed control for the linear actuators; speed synchronization for the linear actuators; direction control or timed control options for linear actuator activation; multiple program time options within a 24 hour period; interval mode program time options for specific time intervals; and compatibility with both 3-wire and 4 wire feedback signal actuators.

In some embodiments, the timed-access control system further comprises: a weatherproof control box housing and cover; an electrical junction box and wiring terminals; and waterproof electric connectors configured to withstand year-round harsh weather conditions and configured to further house: the actuator controller; the solar panel charge controller; the primary battery; at least one bin storage feed volume sensor and feedback reporting transmitter; and a remote control system receiver.

In some embodiments of the multi-purpose gravity-fed feeder system, the linear actuator; and the weatherproof control box and cover and the backup battery are affixed to the actuator tower.

In some embodiments of the multi-purpose gravity-fed feeder system, the at least one feed metering device comprises: a feed bin funnel plate to slow and divert the gravity flowing feed from the storage feed bin; or an adjustable plate used to control the flow of feed from the gravity-fed storage feed bin funnel plate to the feed tray; or a wire mesh or grid configured to restrict excessive flow of feed from the storage feed bin, or access to the feed by the target animal from the gravity-fed storage bin; or a combination thereof.

In some embodiments of the gravity-fed feed storage bin, the two or more separable hoppers for storing and dispensing said combination of nutrient-rich feed attractant are separable by a removeable divider within the feed storage bin.

In some embodiments, the combination of nutrient-rich feed attractant comprises protein-rich pellet feed; or whole grain feed; or protein-rich plant feed; or cottonseed; or dried whole kernel corn; or field corn; or soybeans; or milo seed or any combination thereof.

In some embodiments, the combination of nutrient-rich feed attractant further comprises protein-based compressed feed pellets; and forage-based feed pellets wherein said nutrient-rich feed pellets further comprise minerals, vitamins, fats and salts.

In some embodiments of the timed-access control system, said system controls the number of times per day a target animal can access the feed attractant from the feed tray and feed metering wire mesh of the multi-purpose feeder.

In some embodiments of the timed-access control system, said system controls the time of day a target animal can access feed attractant from the feed tray and feed metering wire mesh of the multi-purpose feeder.

In some embodiments of the timed-access control system, said system controls a window of time a target animal can access feed attractant from the feed tray and feed metering wire mesh of the multi-purpose feeder.

Provided herein is a multi-purpose, gravity-fed feeder system comprising a timed-access control system configured to attract a target animal wherein said timed access control system controls the time of the day, the number of times per day and the duration or window of time a feed attractant is accessible; wherein said multi-purpose, gravity-fed feeder system comprises a plurality of nutrient-rich feed attractant; a dividable gravity-fed feed storage hopper in a storage bin; two or more feed access control door assemblies; and wherein said timed-access control system comprises: an actuator controller with LCD interface configured to make feed attractant accessible during hours when harvesting is legal, by activation of said feed access control door assemblies, through activation of the actuator controller with LCD interface, with linear actuators attached to two or more actuator push-pull arms further attached to the two or more feed access control door assemblies; and an actuator tower and actuator assembly mount affixed to said feeder system to hold said linear actuators and actuator push-pull arms; wherein said dividable gravity-fed feed storage bin hopper is configurable for storing and dispensing said plurality of nutrient-rich feed attractant.

In some embodiments of the multi-purpose, gravity-fed feeder system, the timed-access control system comprises the actuator controller electrically connected to the linear actuators; a primary rechargeable battery electrically connected to the timed-access control system; a solar panel electrically connected to the rechargeable battery; and a solar panel charge controller electrically connected to the solar panel; wherein said solar panel is configured to maintain and recharge the primary rechargeable battery and wherein said solar panel charge controller is configured to control the amount and rate of charge to the rechargeable battery.

In some embodiments of the multi-purpose, gravity-fed feeder system, the timed-access control system comprises: a programmable timer switch, a feed access control door assembly, a linear actuator, an actuator push-pull arm and assembly mount, an electromagnetic coil relay, a rechargeable battery and a solar panel, wherein said solar panel is configured to maintain and recharge the primary battery.

In some embodiments of the timed-access control system, the actuator controller with LCD interface comprises a printed circuit board (PCB) that acts as an actuator controller with an internal timer control and multiple internal digital relays, and can be substituted for the electromagnetic coil relays and the separate programmable timer switch.

In some embodiments of the timed-access control system, the actuator controller with LCD interface comprises static memory to maintain timer settings.

In some embodiments of the multi-purpose, gravity-fed feeder system, the timed-access control system further comprises a back-up battery, wherein said backup battery is configured to maintain static memory settings of the timed access control system in the event power is lost from the primary battery, and wherein said backup battery is rechargeable.

In some embodiments of the multi-purpose, gravity-fed feeder system, said solar panel and solar panel charge controller are also configured to maintain and recharge the backup battery.

In some embodiments of the multi-purpose, gravity-fed feeder system, the timed-access control system further comprises: a control box housing; an electrical junction box; and waterproof electric connectors configured to withstand year-round harsh weather conditions.

In some embodiments of the multi-purpose, gravity-fed feeder system, the system further comprises scent openings in the feed access control door.

In some embodiments of the timed-access control system, the timed-access control system further comprises a remote control system receiver allowing for manual operation of the control system by a remote operator.

In some embodiments, the multi-purpose, gravity-fed feeder system further comprises a bin storage feed volume indicator and feedback reporting system to send feeder system bin storage feed volume data back to a central hub.

In some embodiments, the multi-purpose, gravity-fed feeder system further comprises at least one camera.

In some embodiments, the multi-purpose, gravity-fed feeder system further comprises a cellular system to send camera transmissions back to a central hub.

In some embodiments, the multi-purpose, gravity-fed feeder system utilizes a cellular trail camera to send visual data of feed bin levels back to a central hub.

In some embodiments, the multi-purpose, gravity-fed feeder system further comprises a noise maker that activates when the feed access control door opens. In some embodiments, the noise maker will sound for a period of time defined by a user. In some embodiments, the noise maker will generate sounds that will attract deer, in particular bucks.

Provided herein is an improved multi-purpose gravity-fed feeder system configured to provide nutrient-rich feed attractant to a target animal at a feeder site during specific hours, said multi-purpose, gravity-fed feeder system comprising: a timed-access control system mounted in a control box, comprising: a controller housing with a LCD touchscreen interface comprising; an actuator controller PCB, comprising; multiple internal digital relays; multiple 3-wire or 4-wire feedback signal actuators; a power indicator; an internal timer control; and actuator feedback indicators; wherein the LCD touchscreen interface provides for operator programmable input, wherein the multiple internal digital relays are configured to trigger multiple actuator controllers, and wherein the internal timer control provides for interval modes with customizable delay times for actuating the actuators.

In some embodiments of the improved multi-purpose gravity-fed feeder system, the system further comprises a gravity-fed storage bin, at least one feed access control door assembly, at least one linear actuator, at least one actuator push-pull arm, an actuator tower, an assembly mount for attachment to a multi-purpose gravity-fed feeder and an internal power supply. In a preferred embodiment the internal power supply comprises at least one rechargeable battery. Other alternative power supplies may also be considered.

In some embodiments of the improved multi-purpose gravity-fed feeder system, the system further comprises a solar panel electrically connected to the primary rechargeable battery, and a solar panel charge controller electrically connected to the solar panel; wherein said solar panel is configured to maintain and recharge the at least one rechargeable battery and wherein said solar panel charge controller is configured to control the amount and rate of charge to the at least one rechargeable battery.

In some embodiments of the improved multi-purpose gravity-fed feeder system, the actuator controller PCB, provides for speed adjustments for extension and retraction of the at least one linear actuator.

In some embodiments of the improved multi-purpose gravity-fed feeder system, the internal timer control provides for at least four program times within a 24 hour period.

In some embodiments of the improved multi-purpose gravity-fed feeder system, the weather-resistant control box comprises internal lighting, weather seals for an entry door and a vent, cable glands around external wiring ports and at least 14G wiring for power.

In some embodiments of the improved multi-purpose gravity-fed feeder system, the at least one feed access control door assembly further comprises weather stripping around the top edge of the door to seal out moisture and protect the feed attractant inside the feeder from moisture penetration.

In some embodiments, the improved multi-purpose gravity-fed feeder system further comprises moisture or rain diverters around a top or lid of the feeder system to divert rain, overnight condensation or snow away from a feed attractant storage bin in the gravity-fed feeder system.

In some embodiments, the improved multi-purpose gravity-fed feeder system further comprises external wiring 304 SS conduit to protect control wiring between the control box and the at least one linear actuator from rodents and/or antlers of aggressive target animals.

In some embodiments of the improved multi-purpose gravity-fed feeder system, the external wiring conduit or braided sleeve comprises stainless steel. In some embodiments the preferred stainless steel is 304 SS.

In some embodiments of the improved multi-purpose gravity-fed feeder system, the control wiring further comprises wire shielding comprising polyethylene shrink tubing having an internal layer of thermoplastic adhesive; a temperature rating between at least −40° C. and +125° C.; a working voltage rating up to at least 440 Volts and chemical resistance to aqueous salt solutions, oils, gasoline, diesel fuel, simple alcohol solutions, strong base solutions, diluted inorganic acid solutions, bleach solutions, and diluted peroxide solutions.

Additional aspects and advantages of the present disclosure will become readily apparent to those skilled in this art from the following detailed description, wherein only exemplary embodiments of the present disclosure are shown and described, simply by way of illustration of the several modes or best mode contemplated for carrying out the present disclosure. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the system and apparatus are set forth with particularity in the appended claims. A better understanding of the features and advantages of the present system and apparatus will be obtained by reference to the following detailed description that sets forth illustrative embodiments, in which the principles of the system and apparatus are utilized, and the accompanying drawings of which:

FIG. 2A is a front, side and perspective view of the left side door ramp with wire mesh/grid feed restrictor.

FIG. 2B is a front, side and perspective view of the right side door ramp with wire mesh/grid feed restrictor.

FIG. 3 is a right perspective view of the feed bin of the multi-purpose feeder without any controls or actuator mechanisms, with the top cover door panel open, a closed grain/feed metering plate, a wire mesh/grid feed restrictor and illustrative internal feed bin separating baffle.

FIG. 6A is a top view of the feed bin top cover (door) panel. FIG. 6B is a side edge view of the feed bin top cover (door) panel.

FIG. 6C is an end edge view of the feed bin top cover (door) panel.

FIG. 6D is a perspective view of the feed bin top cover (door) panel.

FIG. 7A is a front view of the sliding bin door showing reinforcing struts, push/pull arm pins and door ramp pins.

FIG. 7B is a side edge view of the sliding bin door showing the push/pull arm pins.

FIG. 7C is a perspective view of the sliding bin door showing reinforcing struts, push/pull arm pins and door ramp pins.

FIG. 8A is a top view of the multi-purpose feeder skid sub-assembly.

FIG. 8B is a side view of the multi-purpose feeder skid sub-assembly.

FIG. 8C is an end view of the multi-purpose feeder skid sub-assembly.

FIG. 8D is a perspective view of the multi-purpose feeder skid sub-assembly.

FIG. 9A is a front view of the actuation housing tower as seen from the left or right end views of the multi-purpose feeder.

FIG. 9B is a right (side) view of the actuation housing tower as seen from the front or back views of the multi-purpose feeder.

FIG. 9C is stand-alone perspective view of the actuation housing tower.

FIG. 10A is a front view of the actuation push-pull arm.

FIG. 10B is a right edge view of the actuation push-pull arm.

FIG. 10C is a right perspective view of the actuation push-pull arm.

FIG. 11 is a representative front view of the open controller box housing the timed access control system for the multi-purpose feeder system.

FIGS. 14-A-14-D are detailed views and specifications for cable glands used for the controller box housing for the 2-Wire Cable, 14 AWG or 16 AWG used to carry current to the electrical components of the system.

FIGS. 15-A-15-B are perspective views of the multi-purpose feeder with external moisture or rain diverters around the top or lid of the feeder system and weather stripping around the top edge of the access door.

Figure 1B:
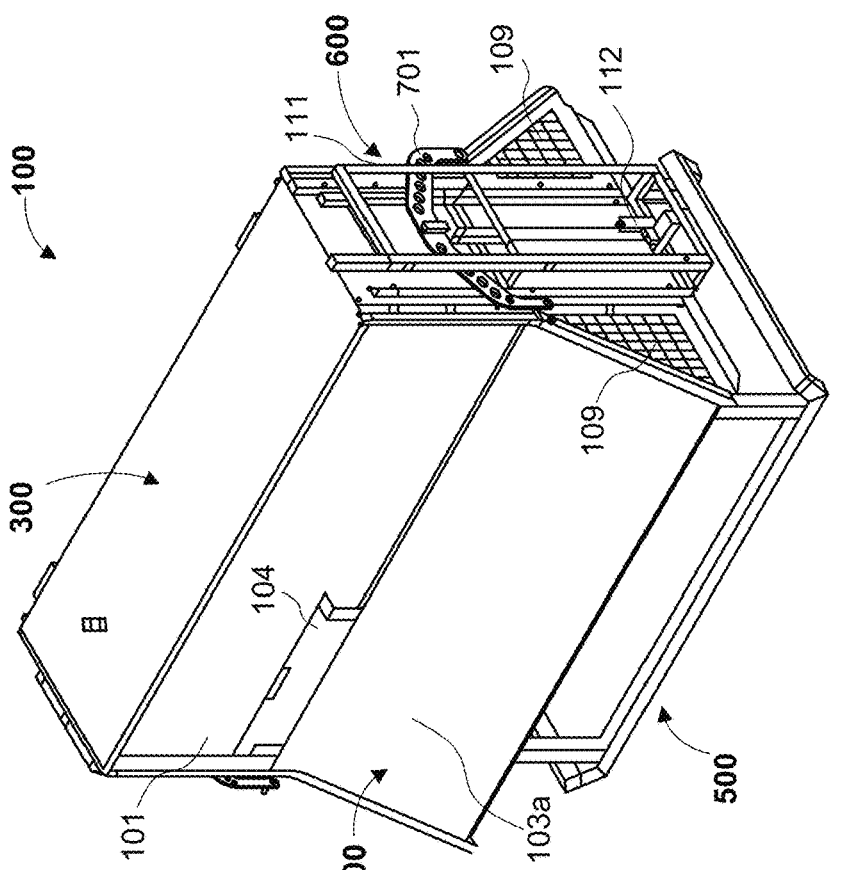
FIG. 1B is a right perspective view of the multi-purpose feeder with a timed access control system with all doors and cover closed.
Figure 1A:
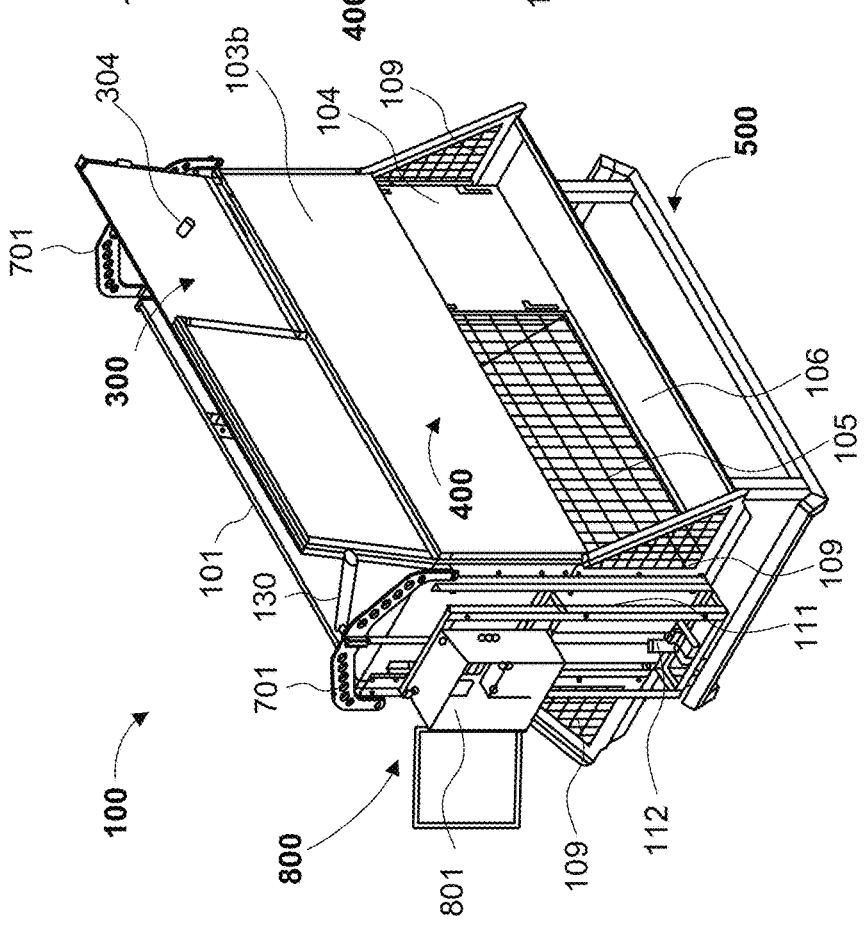
FIG. 1A is a left perspective view of the multi-purpose feeder with a timed access control system with all doors and cover open.

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

While preferred embodiments of the present disclosure have been shown and described herein, it will be obvious to those skilled in the art that such embodiments are provided by way of example only. Numerous variations, changes, and substitutions will now occur to those skilled in the art without departing from the system and apparatus, in accordance with the claims. It should be understood that various alternatives to the embodiments of the system and apparatus described herein may be employed in practicing the system and apparatus.

The present device will now be described more fully hereinafter with reference to the accompanying drawings which illustrate embodiments of the multi-purpose feeder with a timed access control system. This system and apparatus may, however, be embodied in many different forms and should not be construed as limited to the illustrated embodiments set forth herein. Rather, these embodiments are provided so that this disclosure will be thorough and complete, and will fully convey the scope of the device to those skilled in the art.

The following description of the exemplary embodiments refers to the accompanying drawings. The following detailed description does not limit the system and apparatus. Instead, the scope of the system and apparatus is defined by the appended claims.

Reference throughout the disclosure to "an exemplary embodiment," "an embodiment," "a representative embodiment," or variations thereof means that a particular feature, structure, or characteristic described in connection with an embodiment is included in at least one embodiment of the subject matter disclosed. Thus, the appearance of the phrases "in an exemplary embodiment," "in an embodiment," "in a representative embodiment," or variations thereof in various places throughout the disclosure is not necessarily referring to the same embodiment. Further, the particular features, structures or characteristics may be combined in any suitable manner in one or more embodiments.

As used herein, and unless otherwise specified, the term "cotton seed," "fortified whole cotton seed", "fortified WCS", or "fortified cotton seed" generally refers to any specially formulated whole cotton seed feed that has been treated with a food binding agent that allows for coating the WCS with additional protein, intended for ruminant populations, such as white-tailed deer, for example, to supplement protein intake during the summer months, (April-September) when antler growth occurs.

As used herein, and unless otherwise specified, the term "feed attractant," "nutrient-rich feed attractant," and similar terms refers to supplemental feed provided to a target animal to enhance its wellbeing and in particular, for whitetail deer, to supplement and provide the best nutrients for antler growth, particularly between about April through September, when mineral deposition may exceed mineral intake, and to build energy reserves prior to rutting season, typically occurring during the Fall months, often spanning mid-to-late October through December.

Other benefits of providing multiple types of nutrient-rich feed attractant include:

Nutritional Health Enhancement: Protein is crucial for body and antler growth. While deer need about 7% protein for normal bodily functions, optimal levels range from 16% to 20%. Energy requirements vary across seasons and age classes. Carbohydrate-rich foods (such as corn) serve as good energy sources, but cellulose (found in woody plants) is the primary energy source for white-tailed deer. Minerals and vitamins also play essential roles in deer nutrition, although their specifics are less understood than protein or energy.

Antler Growth Enhancement: in most cases, supplemental feeding can lead to increased antler growth in bucks. However, this effect is more pronounced when age is not a primary limiting factor. Younger bucks benefit more from supplemental feed in terms of antler development. Adequate nutrition supports antler growth, but it's essential to consider other factors like genetics and habitat quality.

Post-Rut Recovery: After the intense breeding season (rut), deer experience stress and depletion. Optimal supplemental feed, such as a mix of protein, corn, and beans, helps deer recover from the rut and winter stress. Ensuring deer enter spring in peak condition contributes to their overall health and reproductive success.

Complementing Natural Forage: While deer primarily browse on native vegetation, supplemental feed can complement natural forage. Supplemental feeding of protein pellets specifically formulated with amino acids, vitamins, fats and minerals to promote antler growth, maintain muscle mass and body growth.

As used herein, and unless otherwise specified, the term "about" or "approximately" means an acceptable error for a particular value as determined by one of ordinary skill in the art, which depends in part on how the value is measured or determined. In certain embodiments, the term "about" or "approximately" means within 1, 2, 3, or 4 standard deviations. In certain embodiments, the term "about" or "approximately" means within 30%, 25%, 20%, 15%, 10%, 9%, 8%, 7%, 6%, 5%, 4%, 3%, 2%, 1%, 0.5%, 0.1%, or 0.05% of a given value or range. In certain embodiments, the term "about" or "approximately" means within 40.0 mm, 30.0 mm, 20.0 mm, 10.0 mm 5.0 mm 1.0 mm, 0.9 mm, 0.8 mm, 0.7 mm, 0.6 mm, 0.5 mm, 0.4 mm, 0.3 mm, 0.2 mm or 0.1 mm of a given value or range. In certain embodiments, the term "about" or "approximately" means within 5.0 kg, 2.5 kg, 1.0 kg, 0.9 kg, 0.8 kg, 0.7 kg, 0.6 kg, 0.5 kg, 0.4 kg, 0.3 kg, 0.2 kg or 0.1 kg of a given value or range, including increments therein. In certain embodiments, the term "about" or "approximately" means within 1 hour, within 45 minutes, within 30 minutes, within 25 minutes, within 20 minutes, within 15 minutes, within 10 minutes, within 5 minutes, within 4 minutes, within 3 minutes within 2 minutes, or within 1 minute. In certain embodiments, the term "about" or "approximately" means within 20.0 degrees, 15.0 degrees, 10.0 degrees, 9.0 degrees, 8.0 degrees, 7.0 degrees, 6.0 degrees, 5.0 degrees, 4.0 degrees, 3.0 degrees, 2.0 degrees, 1.0 degrees, 0.9 degrees, 0.8 degrees, 0.7 degrees, 0.6 degrees, 0.5 degrees, 0.4 degrees, 0.3 degrees, 0.2 degrees, 0.1 degrees, 0.09 degrees. 0.08 degrees, 0.07 degrees, 0.06 degrees, 0.05 degrees, 0.04 degrees, 0.03 degrees, 0.02 degrees or 0.01 degrees of a given value or range, including increments therein.

As used herein, and unless otherwise specified, the term "plurality", and like terms, refers to a number (of things) comprising at least one (thing), or greater than one (thing), as in "two or more" (things), "three or more" (things), "four or more" (things), etc.

As used herein, the terms "connected", "operationally connected", "coupled", "operationally coupled", "operationally linked", "operably connected", "operably coupled", "operably linked," and like terms, refer to a relationship (mechanical, linkage, coupling, etc.) between elements whereby operation of one element results in a corresponding, following, or simultaneous operation or actuation of a second element. It is noted that in using said terms to describe inventive embodiments, specific structures or mechanisms that link or couple the elements are typically described. However, unless otherwise specifically stated, when one of said terms is used, the term indicates that the actual linkage or coupling may take a variety of forms, which in certain instances will be readily apparent to a person of ordinary skill in the relevant technology.

As used herein, the terms "comprises", "comprising", or any other variation thereof, are intended to cover a nonexclusive inclusion, such that a process, method, article, or apparatus that comprises a list of elements does not include only those elements but may include other elements not expressly listed or inherent to such process, method, article, or apparatus.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

As used herein, the terms "subject" or "target animal" are used interchangeably. As used herein, the terms "subject" and "subjects" refers to an animal, such as a deer. In one preferred embodiment, the subject or target animal is a white-tailed deer.

As used herein, and unless otherwise specified, "user" refers to and means a human operator of the multipurpose feeder with access control.

As used herein, and unless otherwise specified, "window of time" refers to and means a period or interval of time in which an activity or task is desired, allowed or is to be completed. As used herein, a time window, typically occurring within a 24 hour period, but may be longer, and refer to a window of time such as a week, a month or a season. A window of time may occur more than once during the 24 hour period, a week, a month or a season. A seasonal window of time may correspond to a specific period of time such as the "hunting season" or may refer to meteorologic period of time including a plurality, or multiple days, weeks or months of the year.

As used herein, and unless otherwise specified, "duration" refers to and means the amount of time elapsed between two events, such as opening and closing of feed access control doors(s) on the feeders.

As used herein, and unless otherwise specified, the term "anterior" can refer to and means the front surface of the body; often used to indicate the position of one structure relative to another, that is, situated nearer the front part of the body. Alternately, it may also refer in a similar fashion to an apparatus or structure.

As used herein, and unless otherwise specified, the term "posterior" can refer to and means the back surface of the body; Often used to indicate the position of one structure relative to another, that is, nearer the back of the body. Alternately, it may also refer in a similar fashion to an apparatus or structure.

As used herein, and unless otherwise specified, the term "superior" can refer to and means situated nearer the vertex of the head in relation to a specific reference point; opposite of inferior. It may also mean situated above or directed upward. Alternately, it may also refer in a similar fashion to an apparatus or structure.

As used herein, and unless otherwise specified, the term "inferior" can refer to and means situated nearer the soles of the feet in relation to a specific reference point; opposite of superior. It may also mean situated below or directed downward. Alternately, it may also refer in a similar fashion to an apparatus or structure.

As used herein, and unless otherwise specified, the term "medial" can refer to and means situated toward the median plane or midline of the body. Alternately, it may also refer in a similar fashion to an apparatus or structure.

As used herein, and unless otherwise specified, the term "lateral" can refer to and means denoting a position farther from the median plane or midline of the body or a structure. It may also mean "pertaining to a side". Alternately, it may also refer in a similar fashion to an apparatus or structure.

As used herein, the term "proximity" means nearness in space or relationship, but not excluding the potential to be touching. Proximity is also alternatively meant to mean that one thing may be so close to another thing as to be "in direct or nearly direct contact" (in proximity) with another thing along some point. To "place something in proximity" is also meant to mean that items are "paired" or "mated together" either in their paired function or at some point of contact.

As used herein, and unless otherwise specified, the term "vertically oriented" and similar terms mean; generally perpendicular to, at, or near, right angles to a horizontal plane; in a direction or having an alignment such that the top of a thing is above the bottom. In certain embodiments, the term "vertically oriented" means within ±20.0 degrees, ±15.0 degrees, ±10.0 degrees, ±9.0 degrees, ±8.0 degrees, ±7.0 degrees, ±6.0 degrees, ±5.0 degrees, ±4.0 degrees, ±3.0 degrees, ±2.0 degrees, ±1.0 degrees, ±0.9 degrees, ±0.8 degrees, ±0.7 degrees, ±0.6 degrees, ±0.5 degrees, ±0.4 degrees, ±0.3 degrees, ±0.2 degrees or ±0.1 degrees of a given value or range, including increments therein.

As used herein, and unless otherwise specified, the term "horizontally oriented" and similar terms mean; generally perpendicular to, at, or near, right angles to a vertical plane; in a direction or having an alignment such that the top of a thing is generally on, or near the same plane as the bottom, both being parallel or near parallel to the horizon. In certain embodiments, the term "horizontally oriented" means within +20.0 degrees, ±15.0 degrees, ±10.0 degrees, ±9.0 degrees, ±8.0 degrees, ±7.0 degrees, ±6.0 degrees, ±5.0 degrees, ±4.0 degrees, ±3.0 degrees, ±2.0 degrees, ±1.0 degrees, ±0.9 degrees, =0.8 degrees, ±0.7 degrees, ±0.6 degrees, ±0.5 degrees, ±0.4 degrees, ±0.3 degrees, ±0.2 degrees or ±0.1 degrees of a given value or range, including increments therein.

As used herein, and unless otherwise specified, the term "substantially perpendicular" and similar terms mean generally at or near 90 degrees to a given line, or surface or to the ground. In certain embodiments, the term "substantially perpendicular" means within ±20.0 degrees, ±15.0 degrees, ±10.0 degrees, ±9.0 degrees, ±8.0 degrees, ±7.0 degrees, ±6.0 degrees, ±5.0 degrees, ±4.0 degrees, ±3.0 degrees, ±2.0 degrees, ±1.0 degrees, ±0.9 degrees, ±0.8 degrees, ±0.7 degrees, ±0.6 degrees, ±0.5 degrees, ±0.4 degrees, ±0.3 degrees, ±0.2 degrees or ±0.1 degrees of a given value or range, including increments therein.

As used herein, and unless otherwise specified, combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C.

Described herein is a combined multi-purpose feeder system configured to simultaneously supply multiple supplemental nutrient-rich feed attractants to target animals during controlled periods of the day when hunting is legal. It is commonly understood that hunting is only legal during the "daylight" hours in most of the United States, and a general rule of thumb is that period is between 30 minutes before sunrise until 30 minutes after sunset.

Described herein is a combined multi-purpose feeder system configured to provide certain exceptionally desired food attractants that deer typically can't get anywhere else (Cottonseed, soybeans, etc.) at various times of the year, determined by a user and during a specific window of time. The user can determine multiple windows of time. During certain times of the year and years when drought or other factors have affected the food supply, a user may choose to supplement the locally available natural food sources with certain exceptionally desired food attractants such as Cottonseed, soybeans, etc. in order to assure that the target animal population has the nutrients needed, when they are most beneficial, to obtain the healthiest herd possible. A net outcome of this design aspect is that virtually every deer in the area will come to the feeder sooner or later; and when they do come, it will commonly be during a preset window of time, set by the user, when the hunter is commonly there to hunt; such as 30 minutes before sunrise, +2 hours (i.e.: 30 minutes before sunrise and an additional 2 hours after sunrise) and 30 minutes after sunset, −2 hours (i.e.: 2 hours before sunset and an additional 30 minutes after sunset). Another term commonly associated with the time just before sunrise and after sunset is "civil twilight".

Civil twilight is the brightest phase of twilight. It occurs from the moment the sun dips below the horizon and lasts until the center of the sun is geometrically 6 degrees below the horizon. Lawmakers have enshrined the concept of civil twilight, and such statutes typically use a fixed period after sunset or before sunrise, most commonly 20-30 minutes. A good rule-of-thumb for calculating civil twilight is that it usually ends between 20-35 minutes after sunset. The duration of each twilight phase depends on the latitude and the time of the year. In locations where the Sun is directly overhead at noon—for example at the equator during the equinoxes—the Sun traverses the horizon at an angle of 90°, making for swift transitions between night and day and relatively short twilight phases. For example, in Quito, Ecuador, which is very close to the Equator, civil twilight begins only about 21 minutes before sunrise during the equinoxes. At higher latitudes, in both the Northern and Southern Hemispheres, the Sun's path makes a lower angle with the horizon, so the twilight phases last longer: For example:

In New York (about 40° North) and Wellington (about 40° South), during the equinoxes, it takes about 28 minutes from the beginning of civil twilight until the Sun rises.

In Oslo (about 60° North) and the northernmost tip of *Antarctica* (about 60° South), the same process takes roughly 43 minutes.

And in Central Texas (i.e.: Austin, TX.), (about 30° North), the same process takes roughly 24 minutes.

Described herein is a multi-purpose gravity-fed feeder system configured to provide a combination of nutrient-rich feed attractant to a target animal at a feeder site during specific hours, said system comprising: a gravity-fed feed storage bin; at least one feed access control door assembly; at least one feed metering device; a timed-access control system comprising: an actuator controller with LCD interface; at least one linear actuator; at least one actuator push-pull arm; and an actuator tower and assembly mount; wherein said gravity-fed feed storage bin comprises two or more separable hoppers or one dividable hopper for storing and dispensing said combination of nutrient-rich feed attractant, wherein said at least one feed access control door assembly is configured for fixation to said feed storage bin and configurable to cover or uncover a feed tray on the feed storage bin, wherein said actuator push-pull arms are configured for fixation to said feed access control door assembly and further affixed to the linear actuators, wherein said actuator tower and assembly mount are affixed to the gravity-fed feed storage bin, configurable to hold and stabilize the linear actuators and actuator push-pull arms, and wherein said actuator controller with LCD interface is configurable to actuate the linear actuators to push or pull the actuator push-pull arms to open or close the feed access control door assembly at pre-set time intervals to allow a target animal access to said nutrient-rich feed attractant within said feed tray on the feed storage bin.

Turning now descriptively to the drawings, in which similar reference characters denote similar elements throughout the several views, the figures illustrate an example embodiment comprising a gravity-fed feed storage bin; at least one feed access control door assembly; at least one feed metering device; a timed-access control system comprising: an actuator controller with LCD interface; at least one linear actuator and usually two or more linear actuators; two or more actuator push-pull arms; and an actuator tower with an actuator assembly mount, a solar panel, solar panel charge controller, and at least one rechargeable battery; wherein said gravity-fed feed storage bin comprises two or more separable hoppers, or one dividable hopper for storing and dispensing a wide and varied combination of nutrient-rich feed attractant.

Referring now to FIGS. 1A through 1F, a multi-purpose feeder with timed access control system is illustrated with a number of unique features and improvements over conventional deer feeder systems, providing a unique access to a potential variety of supplemental feed sources in coverable distribution trays designed to overcome the primary shortcomings of all common gravity fed deer protein feeders; freestyle feeding and metered style feeding, with no control over the combination of time of day and duration of time when feed attractant is made available. The illustrative multi-purpose feeder is configurable to provide the target animal population with controlled feeding times, and controlled feeding durations, during windows of time and at times of day when hunting is legal. For example, in all the 48 lower United States, legal harvest times for whitetail deer are restricted to daylight hours only, typically 30 minutes before sunrise, until 30 minutes after sunset. Generally speaking, the ideal window of time when a hunter is most likely to be on site to hunt the target animal will be between 30 minutes before sunrise, +2 hours and 30 minutes after sunset, −2 hours.

The illustrative multi-purpose feeder is configurable to provide one or more different feed attractants with variable nutritional characteristics, depending on the time of year and nutritional needs of the target animal.

Specifically, as shown in FIGS. 1A through 1F, is an improved gravity fed multi-purpose feeder having aspects of conventional gravity feeders and cottonseed feeders combined into single multi-purpose design 100 with a unique timed access control system 800. The multi-purpose feeder system 100 comprises a timed-access control system 800 configured to increase opportunities to attract or harvest a target animal at a feeder site during daylight hours, said timed-access control system comprises a closable feed access control door sub-assembly 400 comprising a sliding feed access control door configured to slide vertically up the side of the feed storage bin 101 along door ramps 109b integrated into side metering mesh screens 109 to expose the horizontal feed tray 106 under the sliding door 400; (103a—door closed; 103b—door open). A pair of linear Actuators 112 are mounted in actuator towers 600 affixed on opposite ends of the feed storage bin 101 by welding or bolting the frame 111 directly to the sides of the bin. Said actuators are connected to actuator push/pull arms 701 which in turn are connected to push/pull arm pins 402 affixed to the proximal corners of the sliding feed access control door sub-assembly 400. A corresponding set of door ramp pins 403 are mounted on the distal corners of the sliding feed access control door sub-assembly 400 and track within door ramps 109b on the sides of the feed bin attached to a metering mesh screens 109. When the actuators 112 and the actuator push/pull arms 701 lift the feed access control door sub-assembly 400 from the closed position 103a into an open position 103b the lower internal configuration of the feed bin 101 is exposed, providing for at least three types of feed metering devices. A first metering device is a slidable feed metering plate 104, best configured for limiting the flow of bulk grains, pellets and similarly structured feed attractants. The higher the plate is set vertically, the more feed is allowed to enter the feeding tray 106 from the grain/pellet feed bin 116, above. A second metering device is a feed metering wire mesh or grid 104. The size of the mesh or grid 104 under the feed access control door can be used to control the amount of fibrous nutrient such as fortified cotton seed, and whole cottonseed (WCS) and other foliage-based feeds are accessible to the target animal when the feed access control door is opened, 103b. These types of cotton seed and other foliage-based feeds are stored in the dividable feed bin 101, in separable compartments or hoppers 116, 118 separable by a removeable feed bin baffle 120. A third type of (modified) feed metering wire mesh or grid 109 can be found on exposed ends of the feed tray 106, when the feed access control door is in the down position, 103a. These feed metering wire meshes or grids 109 also act as feed scent openings but can be augmented or replaced with solid panels in the event that other feed scent openings are placed in the sliding door panel/feed access control door 103.

One both ends of the feed bin 101 is an actuator tower 600. The actuator tower 600 is affixed to the feed bin and supports the lifting mechanisms for the feed access control door 400. The lifting mechanism comprises an actuator 112, an actuator stroke rod 114, and an actuator push-pull arm 701 that connects to the push-pull arm pins 402 found on the proximal corners of the of the feed access control doors 400. One of the actuator towers 600 also supports the control box 107 for a timed-access control system 800.

The top of the feed bin 101, is covered with a hinged access door cover 300. The access door cover 300 may have a door access cover opener assembly 130, with a hydraulic or electrical assist device attached, to make it easier for an operator to open or close the cover. The access door cover may also have a lift handle 304 for the same purpose.

The entire multi-purpose gravity-fed feeder system 100 shown in FIGS. 1A-1F is configured to be fitted with a Skid Leg Assembly 500 comprising skids with angled end skid ramps 501, as shown in further detail in FIGS. 8A-8D.

One skilled in the art will quickly recognize that the preceding description describes only a single sliding feed access control door 400. However, as is apparent in the attached figures, the device is easily configured with two sliding feed access control doors 400, for a rectangular-shaped system 100. A larger triangular system 100, with three doors or square-shaped system 100 with four doors is also contemplated herein.

Figure 1C:
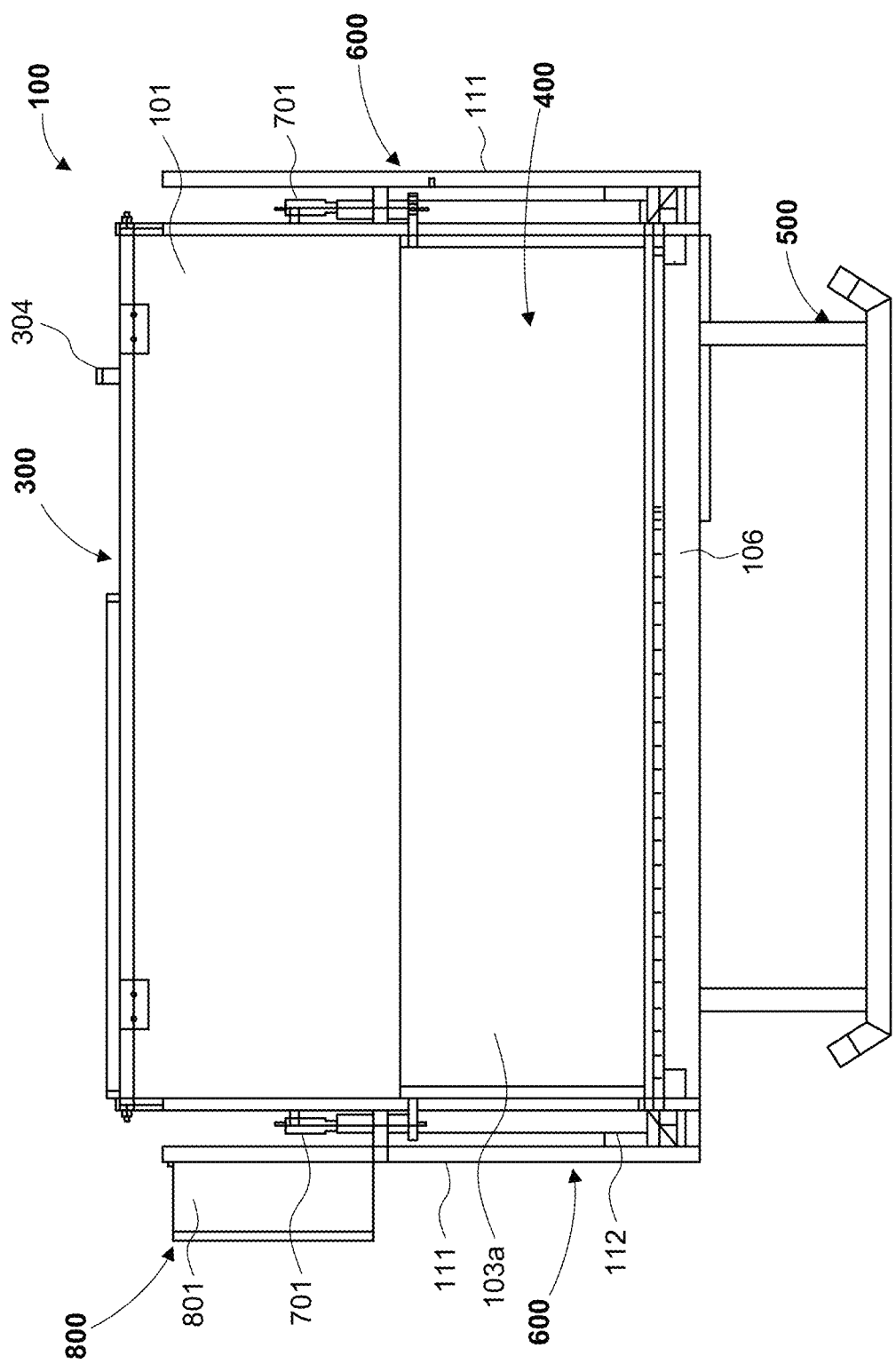
FIG. 1C is a front view of the multi-purpose feeder with a timed access control system with closed sliding door panel.
Figure 1D:
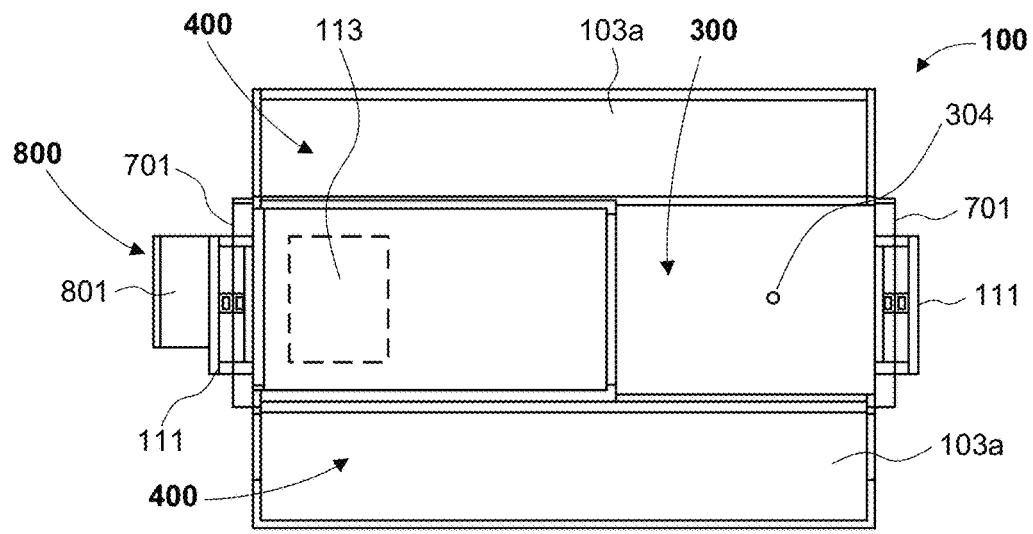
FIG. 1D is a top view of the multi-purpose feeder with a timed access control system with closed top cover (door) panel.

Referring now to FIGS. 1C and 1D, are a front detail view and top detail view of the representative multi-purpose gravity-fed feeder system 100, both shown with the sliding feed access control doors 400 in the down or closed position 103a. In some embodiments of the multi-purpose, gravity-fed feeder system, the system further comprises optional scent openings (not shown) in the feed access control door. Alternately, the side mesh screens 109 also provide feed scent openings wherein natural breezes can waft through the screens to pick up and carry the scent outward.

Also, as shown in FIG. 1D, a possible location for a solar panel 113 is also illustrated on the top exposed surface of the feed storage bin access door cover 400. One skilled in the art would recognize that this is a random position choice for the solar panel and that it could be placed in any number of other positions and locations about the multi-purpose gravity-fed feeder system 100, such as on top of the control box, or one of the actuator towers, for example.

Figures 1E, 1F:
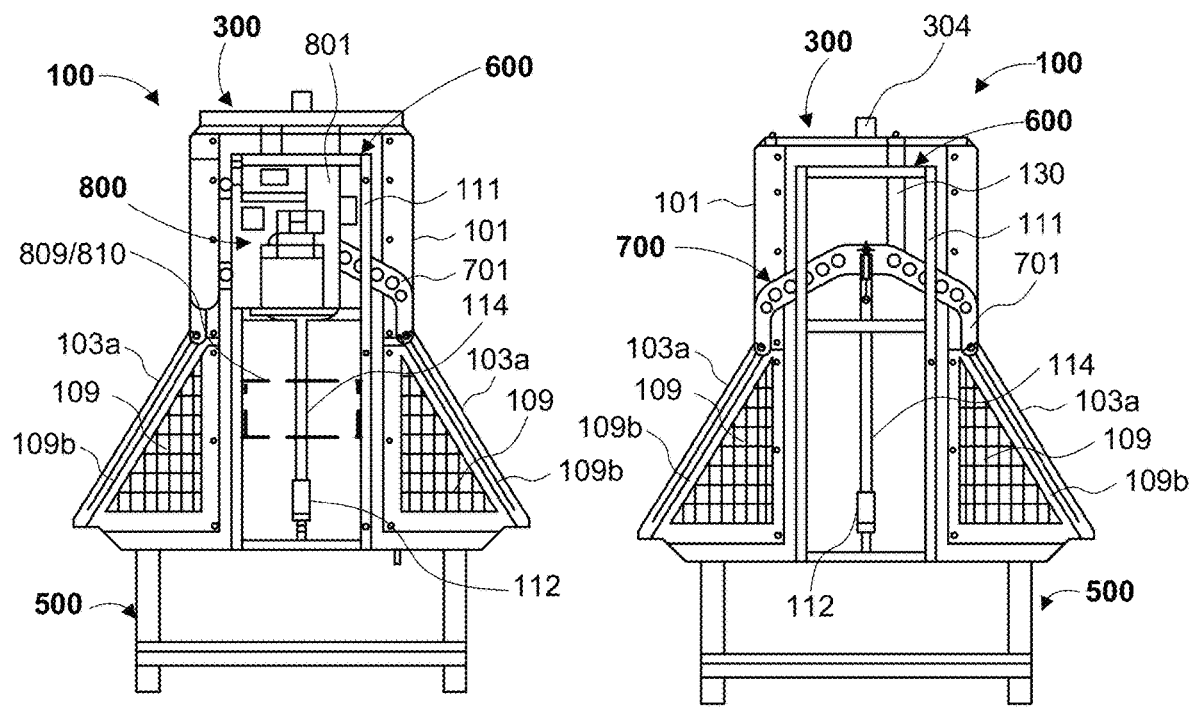
FIG. 1E is a left end view of the multi-purpose feeder with a timed access control system showing an actuator tower, an actuator and the control box.
FIG. 1F is a right end view of the multi-purpose feeder with a timed access control system showing an actuator tower, an actuator and an actuator push-pull arm.

Referring now to FIGS. 1E and 1F, the left end view and left end view of the representative multi-purpose gravity-fed feeder system 100 sitting atop the Skid Leg Assembly 500. In this left end view FIG. 1E, one can see the inner details of the control box 107 (cover removed) housing the timed-access control system 800, mounted on the frame 111 of the actuator tower 600. Also shown are the actuator 112, the actuator stroke rod 114 and the actuator push-pull arm 701 (extending from behind the control box). Also illustrated herein is an optional location for a back-up battery 809 (not shown) and backup battery tray 810, shown in dashed lines, just inferior to the timed access control system 800. One of skill in the art will recognize that the placement location for the backup battery (and tray) is secondary to its function in the system and that it can be located anywhere that is either convenient or simply out of the way, including the other end of the feeder on another actuator tower, Further, the side metering mesh screens 109 are illustrated. Also shown are the locations of the door ramps 109b on the frames of the side metering mesh screens 109, which provide the lower tracks for the feed access control doors 400 when they are in the closed position (103a). In the right end view, FIG. 1F, one can more clearly see the assembly details of the actuator lifting mechanism 600 comprising the actuator 112, the actuator stroke rod 114 and the actuator push-pull arm 701 attached to the actuator stroke rod, mounted on the actuator tower 600, wherein the ends of the actuator push-pull arm 701 are attached to the (long) push-pull arm pins (402) found on the proximal ends of the feed access control doors 400. Also visible in this view is the feed storage bin door access cover opener assembly 130, attached to the feed storage bin door access door cover 300 and the access door cover lift handle 304.

Referring now to FIGS. 2A and 2B, illustrating representative examples of the front, side and perspective views of the left and right end wire mesh/grid feed restrictors 109 which are tentatively located along the ends of the feed tray 106. The door ramps 109b are illustrated in the perspective view of each figure. As noted previously, the door ramps 109b are configured to provide a track mechanism to locate the (short) door ramp pins 403 located on the distal ends of the feed access control doors 400 when they are in the closed position (103a). Once of skill in the art would also recognize that the left and right end wire mesh/grid feed restrictors 109 could also be replaced with solid panels in lieu of wire mesh/grid if the feed attractant is too fine to be restricted by the wire mesh/grid feed restrictors.

Referring now to FIG. 3, illustrating a right perspective view of the feed bin 101 (as a sub-assembly) of the multi-purpose feeder without any controls or actuator mechanisms, with the top cover door panel 300 in an open position, a closed grain/feed metering plate 104, a wire mesh/grid feed restrictor 105 and an illustrative internal feed bin separating baffle 120. As noted previously, the illustrative internal feed bin separating baffle 120 is removeable and can be positioned anywhere, or in multiple locations, within the feed bin creating two or more hoppers within the feed bin. In this illustrative example, two hoppers are shown: for example, hopper 116 may be for a grain or protein pellet feed bin hopper, whereas hopper 118 may be utilized for a cotton seed hopper.

Figure 4:
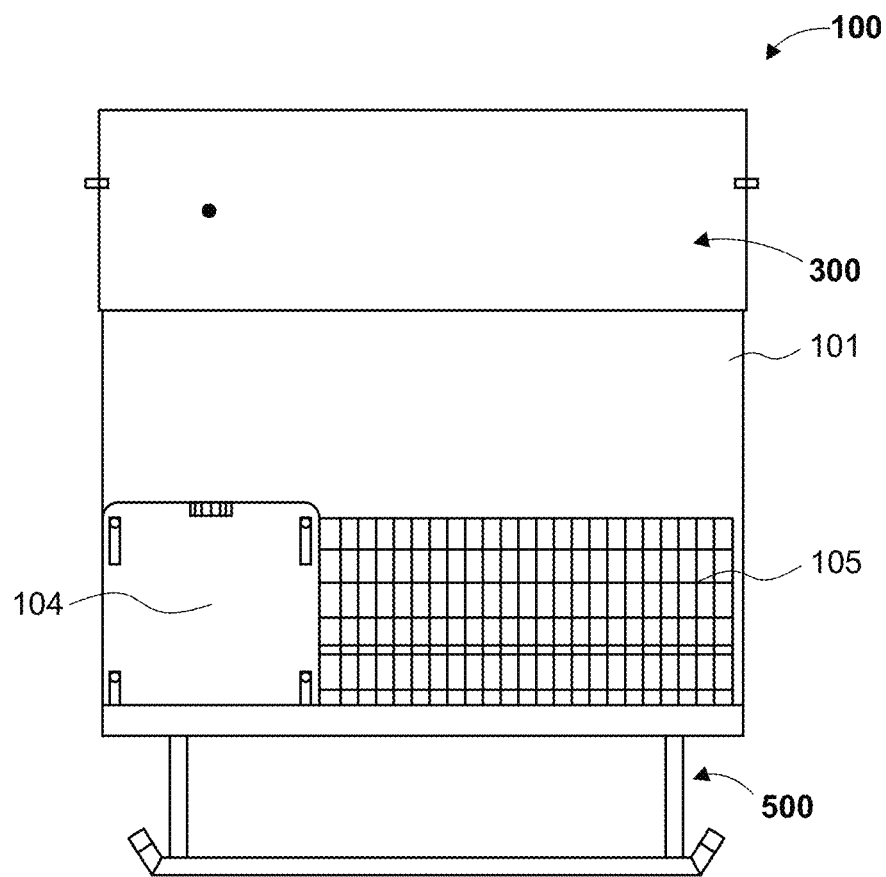
FIG. 4 is a back view of the feed bin of the multi-purpose feeder without any controls or actuator mechanisms, with the top door cover panel open, a closed grain/feed metering plate, and a wire mesh/grid feed restrictor.

Referring now to FIG. 4, illustrating a back view of the feed bin 101 (as a sub-assembly) of the multi-purpose feeder 100 without any controls or activation mechanisms, the feed access control doors 400 removed, with the top door cover panel 300 open, a closed grain/feed metering plate 104, and a wire mesh/grid feed restrictor 105.

Figure 5A:
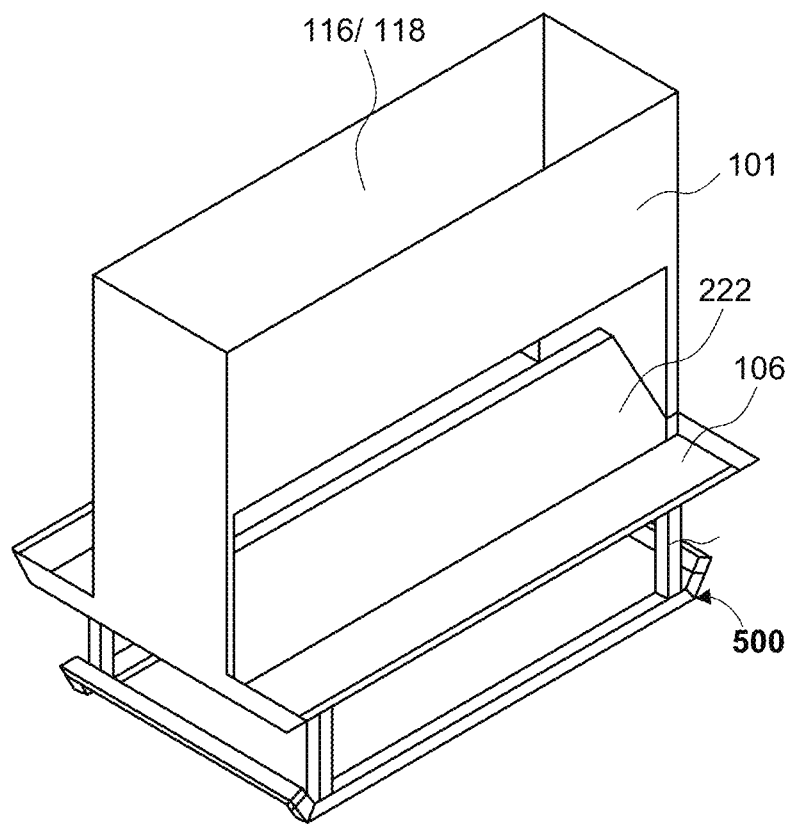
FIG. 5A is a left perspective view of the multi-purpose feeder bin sub-assembly with all doors, screens and baffle removed, showing an internal feed bin funnel plate assembly for diverting feed attractant to the trays on either side of the feeder.

Referring now to FIG. 5A, illustrating a left perspective view of the multi-purpose feeder bin sub-assembly 101 with all doors, screens and separating baffle removed, showing an internal feed bin funnel plate assembly 222 for diverting feed attractant to the feed trays 106 on either side of the feeder at the internal base of the hopper area 116,118 inside the feeder bin sub-assembly 101.

Figure 5B:
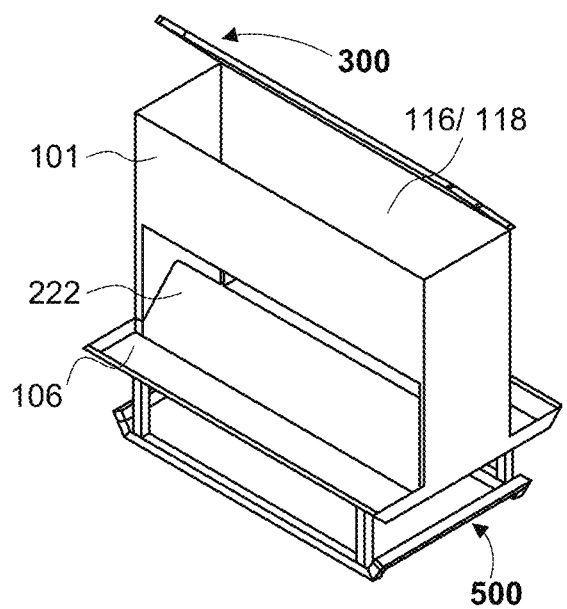
FIG. 5B is a right perspective view of the multi-purpose feeder bin sub-assembly with the top door cover panel partially opened and all other doors, screens and baffle removed, showing an internal feed bin funnel plate assembly for diverting feed attractant to the trays on either side of the feeder.

Referring now to FIG. 5B, illustrating a right perspective view of the multi-purpose feeder bin sub-assembly 101, similar to FIG. 5A, with all doors, screens and separating baffle removed, with the exception of the open hinged access door cover 300 for the feed bin, showing an internal feed bin funnel plate assembly 122 for diverting feed attractant to the feed trays 106 on either side of the feeder at the internal base of the hopper area 116,118 inside the feeder bin sub-assembly 101.

Figure 5C:
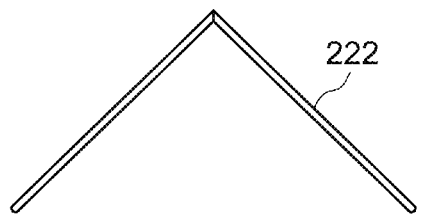
FIG. 5C is an end view of the feed bin funnel plate assembly shown in FIGS. 5A & 5B.

FIG. 5C is a simple illustration of an end view of the internal feed bin funnel plate assembly 222 for diverting feed attractant to the feed trays 106, as shown in FIGS. 5A & 5B. The angle of bend in the internal feed bin funnel plate also affects the rate of flow and volume of feed delivered to the feed tray.

Figure 5D:
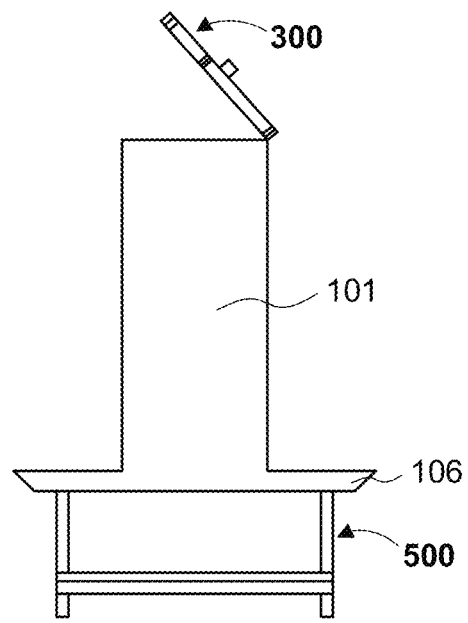
FIG. 5D is a left end view of the multi-purpose feeder bin sub-assembly with the top door cover panel partially opened.

FIG. 5D is a simple illustration of a left end view of the multi-purpose feeder bin sub-assembly 101 with the top door cover panel 300 partially opened.

Referring now to FIGS. 6A-6D, illustrating representative examples of the hinged access door cover 300 for the feed bin. As shown, the illustrative hinged access door cover comprises hinges 302, mounted along the long, posterior edge of the feed bin cover plate 301, with at least one door opener arm pin 303 affixed to at least one short edge of the feed bin cover plate 301, configured for attachment to a cover door opener arm assembly 130 (not shown). Also shown herein is a representative cover handle 304 for manually opening of the hinged access door cover 300.

FIGS. 7A-7C represent illustrative top, side and perspective views of the sliding feed bin door assemblies 400 utilized to cover/uncover the feed trays 106 and of the multi-purpose feeder 100. As shown, the illustrative sliding feed bin door assembly 400 comprises the door panel 401 and may also comprise optional door cross-bracing supports 404 to reinforce the doors in the event of pressure applied by assertive target animals. Also illustrated herein are the two (long) push-pull arm pins 402 positioned on the proximal corner of each short side of the panel for attachment to the attachment hole 703 of the actuator push-pull arm 700. Further, illustrated herein are the (short) door ramp pins 403 in the distal corner of each short side of the panel for attachment to the track within door ramps 109b on the sides of the feed bin attached to a metering mesh screens 109. Alternatively, the short door ramp pins 403 in the distal corner of each short side of the panel could be small pulley wheels to allow for smoother and quieter sliding transitions of the sliding feed bin door assembly 400.

Referring now to FIGS. 8A-8D, top, side, end and perspective views of the skid frame assembly 500 are illustrated. Although not unique to deer feeders, the skid frame is a practical addition to this system given the size and universal appeal this system has with its multi-purpose function. The skid assembly provides the user with a much easier way to move the unit about the ranch, without the need to actually pick it up and load it into a transport vehicle. Ranchers and hunters will often move their feeders to place them in better locations to address their herds or target animals based on the time of year and nutritional needs of the herd at that time.

The skid frame 500 typically comprises two (or more) parallel running skids 501, often with ramped ends tied together with a crossbar 502 for support. The ramped ends provide for smoother sliding of the skids over terrain and minimize the amount of "digging in" that occurs when the skid is pulled. The ramped skids are usually welded together but could be bolted together to allow for easier field maintenance and replacement. The skids themselves are fitted with legs 503 for direct attachment to the feeder frame or feeder bin 101. As with the skids, the legs themselves could be welded directly to the feeder frame or feeder bin or could be bolted together to allow for easier field maintenance and replacement.

FIGS. 9A-9C are representative front, side and perspective views of the actuator tower 600 which is attached to the ends of the feed bin and configured to hold and stabilize the lifting mechanism assembly 700 (comprising previously described components 701, 111, 112 and 114) for the sliding bin doors 400, also described previously.

The actuator tower assembly 600 comprises a general frame 111 structure comprising a back mounting frame 601, a front (control box 801) mounting frame 602 various intermediate stiffener sub-frames 603 and an actuator mounting base 604 for attaching the lift actuator 112 and actuator stroke rod 114 to the general frame assembly.

FIGS. 10A-10C are representative front, side and perspective views of a representative actuator push-pull arm 700 assembly. As shown herein, the representative actuator push-pull arm 700 assembly comprises the actuator push-pull arm 701, an actuator rod mount 702 for attaching the actuator stroke rod 112, sliding door push-pull pin door mounting holes 703 for attaching the (long) push-pull arm pins of the sliding door 402, and optional lightening holes 704, to reduce the overall weight of the push-pull actuator arm 701 and reduce the load on the actuator 112 and actuator stroke rod 114.

Referring now to FIG. 11, a variant of the timed access control system 800 is represented. As illustrated the representative timed access control system 800 comprises a controller box and battery cabinet housing 801, the housing cover, 802, an actuator controller with LCD interface 803, a solar panel charge controller 804, at least one rechargeable battery 805, J-Box cable glands 806, bolt terminal-to-T2 terminals 807 and a remote control system receiver 808.

The actuator controller 803 for the representative system is an FCB-1 synchronous actuator controller that is electrically connected to the linear actuators 112 and configured to synchronize them so they all run at the same time and for the same time. This means that if one actuator is running slightly slower than another, this controller will force them to run together at the same speed. Additionally, in the event that one or more actuators are under different (weight) loads or forces relative to the others, this controller will force the other faster actuators to slow down and run at the same speed as the slowest one in the system. The FCB-1 controller comprises a "Time of Day" controller option allowing the operator to set the actuators to open and close at (multiple times of day for "windows of time" and days of the week). A representative setting allows the operator to set open/close times up to 5 times in a 24-hour period and also comprises an "interval mode" allowing the operator to set the actuators to open and close after a certain period of time. For example, an operator could set the actuators to open the sliding feed bin doors for 2 hours, then close them for 1 hour, and repeat this cycle continuously within the legal period of day for hunting creating specific windows of time the feed attractant is available for consumption by the target animal. Another critical aspect of this controller is the ability to set "windows of time" for attracting target animals. Two such critical windows of time for a hunter, when a hunter is most likely to be on site to hunt the target animal, will be between: 1) 30 minutes before sunrise, +2 hours, and 2) sunset -2 hours.

The solar panel charge controller 804 is electrically connected to the solar panel and in turn is also connected to the rechargeable batter(ies) and configured to control the amount and rate of charge to at least one rechargeable battery 805. In addition, a backup battery 809 (not shown) is also included as a component of the system herein, (Shown in FIG. 11), optionally located in a battery tray 810 attached to the actuator tower frame 111, (Shown in FIG. 1E), commonly near or below the control box 801 and configured to maintain memory settings of the timed access control system in the event power is lost from the primary battery, and wherein said backup battery is also rechargeable via the solar panel charge controller 804.

Further, the primary battery 805, is configured as a 12V DC rechargeable AGM sealed power supply capable of delivering at least 22 Amp hours. It is configured with a thermoformed plastic case containing absorbent glass mat between lead plates immersed in electrolyte solution. The solution is made of sulfuric acid and water. The case has two male spade terminals, one positive and one negative. The function of the 12-Volt Battery is to provide the power source to operate the electrical components of the invention. The interconnections of the 12-Volt Battery are to the 12-Volt solar panel, to maintain its charge and to connect to the actuator controller with the LCD interface of the actuator controller 803 to energize the electrical system. The AGM (Absorbent Glass Mat) rechargeable 12V battery comprises a fiberglass mat that sits between the positive and negative lead plates of the battery. The fiberglass absorbs and holds the battery acid such that it doesn't flow freely around the battery. Possible variations include lead acid and lithium ion batteries.

In each case, the system electrical connections are made through weatherproof J-Box cable glands 806 and bolt terminal-to-T2 terminals 807 included in the battery cabinet housing 801.

In some embodiments of the timed-access control system, actuator controller with LCD interface 803 comprises static memory to maintain timer settings.

The timed access control system 800 also comprises a remote control system receiver 808 that allows an operator to operate the system remotely, without actually being directly on site with the feeder. Alternatively, the operator can utilize the remote control system receiver 808 to actively perform on-site maintenance, such as servicing the sliding door panel/feed access control door(s) 103, the actuators 112, actuator stroke rod 114, the actuator tower assembly 600, the actuator push-pull assembly 600 or by opening the hinged access door cover 300 of the feed hoppers to refill them with feed attractant after receiving notification of low feed levels from a storage feed volume indicator or sensor (not shown) and/or feedback reporting transmitter (not shown) that is also contemplated for this system and capable of sending feed bin volume data back to a central hub.

In some embodiments, the multi-purpose, gravity-fed feeder system may comprise a bin storage feed volume indicator, such as a simple scale (not shown) mounted on the inside of the hopper and the feedback reporting system may comprise a simple trail camera (not shown) used to record and store visual pictures of the scale data, or the system may utilize a cellular system for recording said data and reporting back to a central hub.

In some embodiments, the multi-purpose, gravity-fed feeder system may further comprise at least one camera. The at least one camera may be a simple trail camera (not shown) used to record visual pictures of the feeder system surroundings and target animal activity—to be retrieved by a user at a later time. In some embodiments, the at least one camera may be a cellular camera capable of sending visual data to a user at a central hub remotely. In some embodiments, the system may employ a combination of simple trail cameras and cellular cameras. In some embodiments, more than one cellular camera may be utilized for tracking recording and transmission of target animal activity and tracking recording and transmission of gravity feeder function and feed level data.

Further, some embodiments of the system may further comprise at least one camera, such as a field trail camera, (not shown) and include a transmitter to send camera transmissions back to a central hub.

Figure 12:
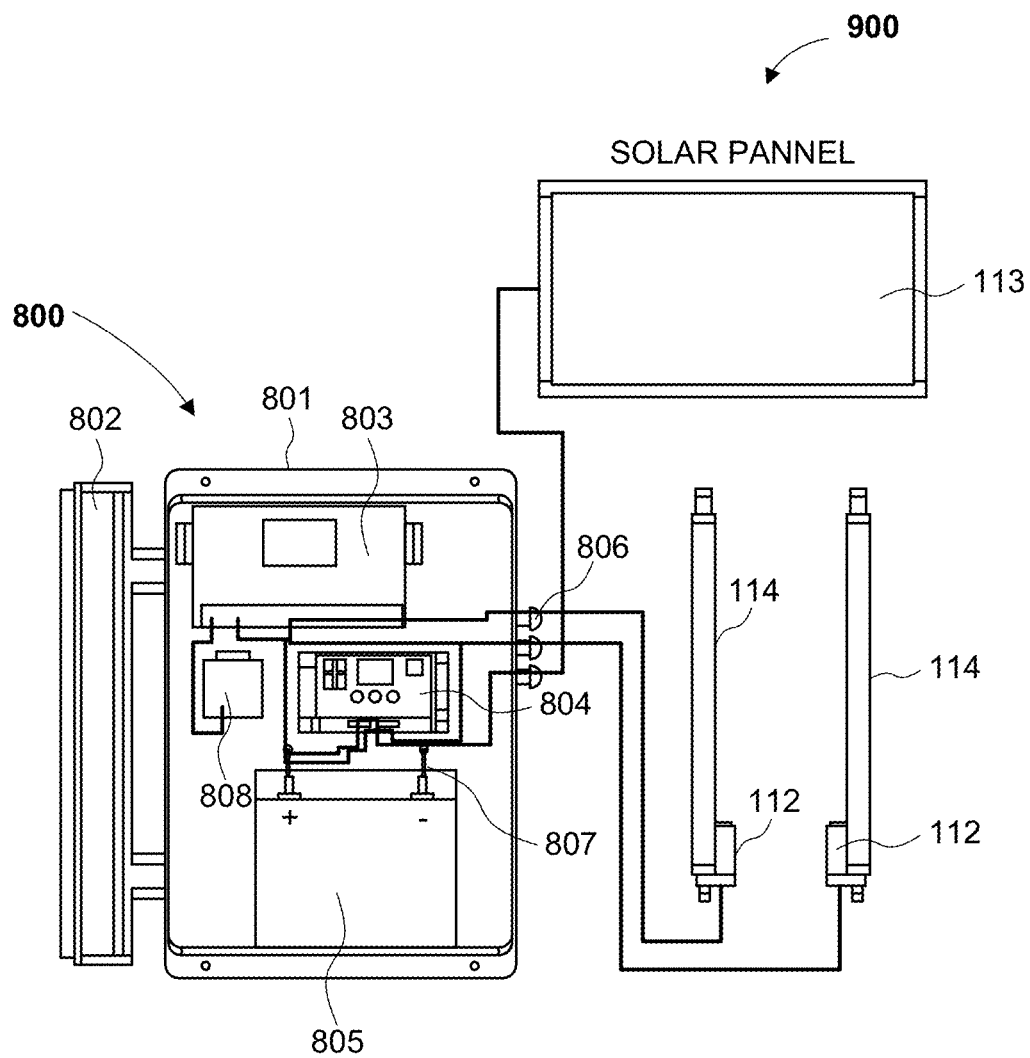
FIG. 12 is a representative general electrical schematic for the multi-purpose feeder system illustrating the connections between the solar panel, batter(ies), the timed access control system and the actuators for the sliding feed bin doors.

FIG. 12 illustrates a representative general electrical schematic 900 for the multi-purpose feeder system 100 illustrating the connections between the solar panel 113, batter(ies) 805, the other timed access control system components 803, 804, 806, 807, 808, a backup battery 809 (not shown) and the actuators 112 for the sliding feed bin doors 400. As noted previously, additional components within the electrical schematic (but not shown) may include a feedback reporting transmitter and a trail camera and camera data transmitter.

The structure of the 2-Wire Cable, 14 AWG utilized in this representative schematic consists of 14-16 AWG stranded copper conductor wires, 1 red, 1 black, formed into a 2-Wire Cable by a PVC jacket that houses both wires. The PVC cable housing is chemical resistant and resistant to UV degradation from sunlight. The rated operating temperature is −35 to +176 degrees Fahrenheit. The maximum working voltage is 300 volts. The 2-Wire Cable, 14 AWG is UL listed, RoHS compliant and has a fireproof rating of VW-1. The function of the 2-Wire Cable, 14 AWG, is to distribute electrical current to the electrical components of the system. Possible structural and functional variations of the wire cable, 14 gauge include 12 AWG or 16 AWG wire.

The 12V DC linear actuator 112 comprises a 12V DC motor, an actuator shaft housing, the actuator (stroke rod or) shaft 114, internal actuator shaft limit switches, mounting bracket connections (holes or brackets) and wire leads from the motor. The structure of the illustrative Linear Actuator 12-Volt is a 12-volt DC motor driven Linear Actuator with a shaft that extends and retracts as needed for the application. The actuator has an aluminum housing that protects the motor, gear box and provides a mounting point at each end for the actuator.

The function of the Linear Actuator 112 is to open and close the Feed Access Control Door assembly 400 with the push-pull arm 701. The Linear Actuator is connected both electrically and mechanically. The electrical connection is from Electrical Junction Box 801 to the Linear Actuator via the 2-wire cable, 14 AWG. The mechanical connection is from the Actuator Base Mounting bracket 604 to the Actuator Shaft Mounting Bracket located at the base of the actuator housing tower 600.

Possible structural and functional variations include 24-, 36- and 48-volt Linear Actuators, and various stroke length actuators.

Specifications of the illustrative linear actuator comprise:
330 lbs. Linear Actuator Multi-function (12V);
Input Voltage 12V DC;
Max Push Load 1500N/330 lbs Max load 150 KG/330 lbs.;
Max Pull Load 1000N/264 lbs.;
Travel Speed 0.59 in/sec (15 mm/s);
Duty Cycle 25% at 100% load
Material: Aluminum alloy;
Operation temperature-40° C. to approximately +65° C.;
Protection Class IP66;
No-load current 0.8A, Max load current 5.5 AMP, 12-volt DC;
22" inch stroke, gear driven linear; and
Noise Level: <50 dB.
Feedback: Hall sensor 4 wire
Feedback voltage: 5V
Limit switches: built in
Possible structural and functional variations include 24-, 36- and 48-volt Linear Actuators, and various stroke length actuators.

The 12-Volt, 100 amp Solar Panel 113, by which the battery 805 maintains its charge, acquires energy gathered from sunlight by the amorphous silicon cells covered by a polycarbonate face, mounted in an aluminum frame. A mounting bracket is part of the frame. The Solar Panel 113 has a positive wire lead and a negative wire lead that connect to the 12-volt Sealed Battery 805 using female spade terminal 14-16 AWG connected to a piggyback double spade terminal on each battery male spade connector post.

Figure 13:
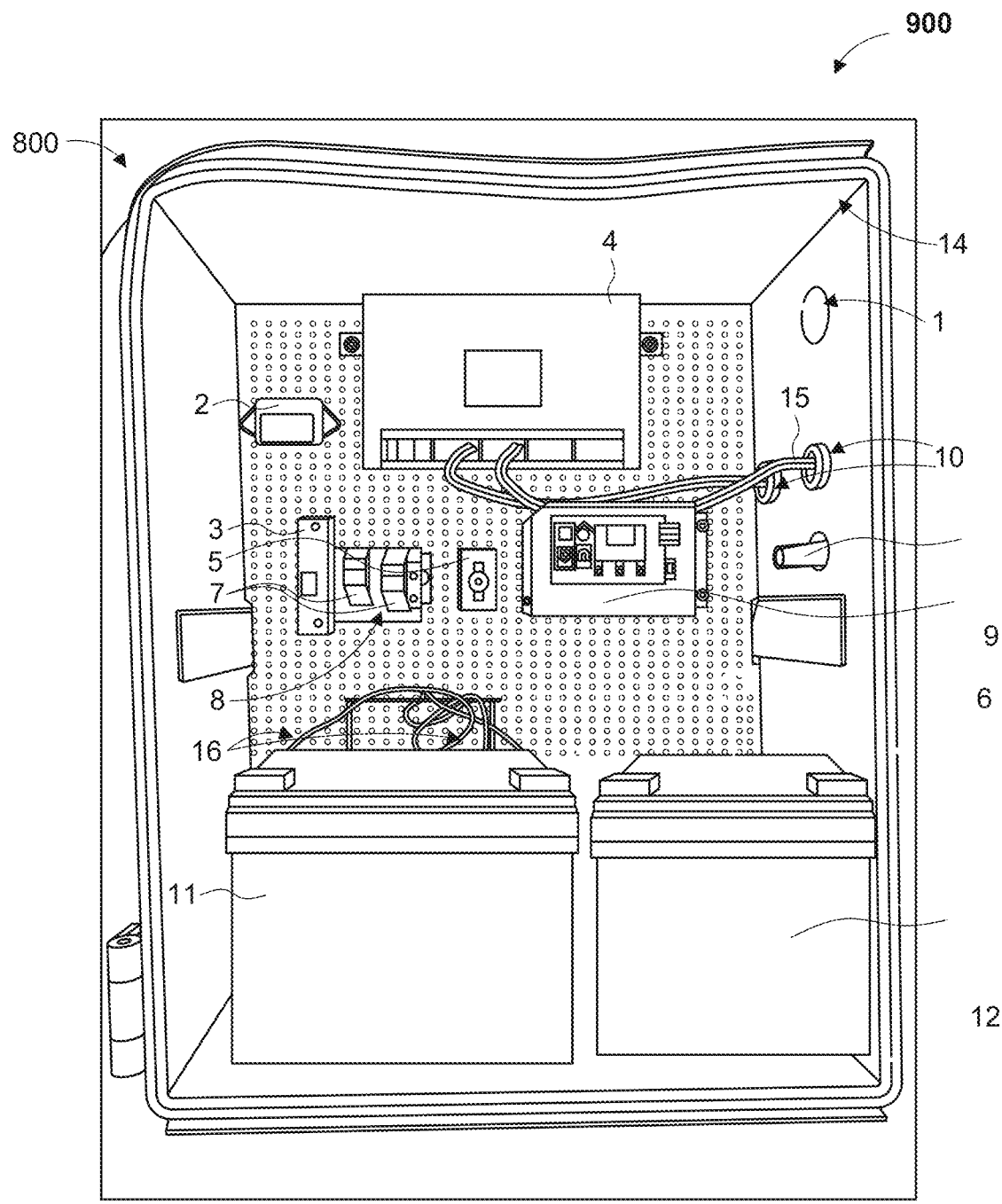
FIG. 13 is an improved representative front view of the open controller box housing the timed access control system for the multi-purpose feeder system with an actuator controller comprising PCB.

Further still, as illustrated in FIG. 13, improved variations of the primary components of the Timed-Access Control System are maintained and mounted within a (weatherized) Control Box housing 14, typically comprising IP67 rated plastic, or 14-gage galvanized steel, optionally comprising a hinged access door (not shown), and adjustable height slotted mounting brackets (not shown). Placement of the control box is thus flexible and allows for variability in terrain and elevation as dictated by the user. In the example shown, the control box is typically mounted on the frame 111 of the actuator tower 600, as previously shown in FIGS. 1A and 1E.

An improved variation of the control box 900 is intended to house the primary AGM (Absorbent Glass Mat) rechargeable 12V battery 11, a back-up AGM (Absorbent Glass Mat) rechargeable 12V battery 12, an Actuator Control PC Board with internal relays 4, an internal LED light 2 for improved low-light visibility, a Toggle Switch 5, a circuit (mini) breaker 3, a Solar Charger Controller with LCD input screen and USB data ports 6, for the previously described Solar Panel 113, Din Rail mountings 8 and terminal blocks 7, a 12 AWG SAE Power Socket Sidewall Port SAE Quick Disconnect Universal Flush-Mountable Connector with 4 Screws, 9 (to power accessory such as trail cam), and IP67 rated cable glands 10 to securely protect and seal the entry points for the jacketed, stranded wire 15, 16 that is ported into the control box. A vent 1, may also be present in the control box 14 which can be fabricated from common materials including aluminum, stainless steel or IP67 rated (or better) plastic.

The improved or upgraded actuator controller with LCD interface comprising a printed circuit board (PCB) acts as an actuator controller with an internal timer control and multiple internal digital relays and can be substituted for the electromagnetic coil relays and the separate programmable timer switch. (One such PCB is a Fergelli FC-1 Actuator Controller).

Alternatively, a typical wiring diagram for this timed-access control system, such as those illustrated in U.S. Pat. No. 12,004,391 B1 or U.S. Pat. No. 12,150,432 B1, may comprise a programmable timer switch that receives power from an AGM (Absorbent Glass Mat) rechargeable 12V battery, which in turn receives maintenance recharging from a solar panel configured to deliver a 12V trickle charge. The programmable timer switch is then configured to periodically activate a 12V DPDT (Double Pole Double Throw) electromagnetic coil relay which then actuates the linear actuator to either open or close the feed access control door.

Also shown in those designs are Electromagnetic Coil Relays to actuate the Linear Actuators which are subsequently replaced by the improved or upgraded actuator controller with LCD interface comprising a printed circuit board (PCB).

Further, the primary battery 11 and back-up battery 12, as illustrated in FIG. 13, are configured as 12V DC rechargeable AGM sealed power supplies capable of delivering at least 7.8 Amp hours, each. They are configured with a thermoformed plastic case containing absorbent glass mat between lead plates immersed in electrolyte solution. The solution is made of sulfuric acid and water. The case has two male spade terminals, one positive and one negative. The function of the primary 12-Volt Battery is to provide the power source to operate the electrical components of the system. The interconnections of the 12-Volt Battery are to connect to the 12-Volt Solar Panel 113 to maintain its charge and to connect to the actuator controller with LCD interface comprising a printed circuit board (PCB) to energize the electrical system. The AGM (Absorbent Glass Mat) rechargeable 12V battery comprises a fiberglass mat that sits between the positive and negative lead plates of the battery. The fiberglass absorbs and holds the battery acid such that it doesn't flow freely around the battery. Possible variations include lead acid and lithium ion batteries.

The 12-Volt Solar Panel 113, provides the renewable energy by which the primary battery 11 and back-up battery 12 maintain their charge. Energy is gathered from sunlight by amorphous silicon cells that are covered by a polycarbonate face, mounted in an aluminum frame. A mounting bracket is part of the frame. The Solar Panel 113 has a positive wire lead, and a negative wire lead, that connect to the 12-volt AGM Sealed Battery 11 (and back-up battery 12) using a female spade terminal 14-16 AWG connected to a piggyback double spade terminal on each battery male spade connector post.

As noted previously in FIG. 12, the solar panel 113 which can be utilized with the improved variation of the control box 900 is configurable to maintain and recharge the primary battery 11 and the backup battery 12, wherein the backup battery 12 is primarily utilized to maintain memory settings of the Timed-Access Control System, with the Actuator Control 4, in the event power is lost from the primary battery 11.

The primary battery 11 powers the Actuator Control 4 and the Actuator(s) 112. Based on the activation times set by the user, the Actuator Control 4 energizes the circuit to the linear actuator(s) 112. The Timed-Access Control System requires the user to set activation times to open and close the Feed Access Control Doors 103a, 103b. The run time for each actuation movement is typically pre-set to 20 seconds, which allows current to flow long enough for the Linear Actuator 112 to either fully extend or fully retract. The direction of movement of the Linear Actuator shaft 114 is determined by Actuator Control 4. The Linear Actuator motor is automatically de-energized by the internal limit switches when the shaft 114 reaches full extension (door fully closed) or full retraction (door fully open).

Setting the programmable timer in the Actuator Control 4 to the first desired Feed Access Control Door opening time will energize the Linear Actuators 112 at the time set and will cause the Linear Actuators shaft 114 to fully retract, thereby opening the Feed Access Control Door/Sliding Door Panel 103a, 103b, providing access to the protein feed attractant. Setting the Programmable Electronic Timer in the Actuator Control 4 to energize again at a selected time will cause the electromagnetic relay coil to energize the Linear Actuator 112 circuit with reversed polarity from the previous polarity, fully extending shaft 114, closing the Feed Access Control Door/Sliding Door Panel 103a, 103b, preventing access to the feed attractant. In a preferred embodiment, this cycle can be set to occur up to 16 times per 24 hour period. Other options are obviously available depending on the programmable electronic timer switch chosen.

As shown in FIGS. 14-A thru 14-D, another critical component of the system comprises the use of waterproof Cable Glands 10. The typical structure of the illustrative Waterproof Cable Glands 10 are shown in FIGS. 14-A & B with a threaded head 21 on female side, inserted over a Claw 22 and Seal 23 which are inserted into a threaded base/body 24. On the male side of the threaded base/body 24 is another threaded connection configured with a sealing gasket 25 at the base of the male thread configured to receive a closing/locking nut 26. The Cable Glands typically have a minimum IP rating of 67. Their function is to provide a separable electrical connection between the walls of the Electrical Junction Box 40 housing 14 to encase and seal the incoming/outgoing jacketed wiring 15, 16, 28 & 40 for the system between the Actuator Control 4 and the Linear Actuators 112.

Specifications of the illustrative waterproof Cable Glands 10 are illustrated in FIG. 14-C. An illustrative depiction of the Cable Glands 10 installed over a sample of incoming/outgoing jacketed wiring 28 (outside of a control box housing) is shown in FIG. 14-D.

Referring now to FIGS. 15-A and 15-B, additional improvements to the gravity fed multi-purpose feeder 200. A rain gutter or "diverter" 30 is shown over the top of the gravity fed multi-purpose feeder 200. Additionally, a weather strip seal 35 is also shown installed along the top edge of the sliding door panels 103a, 103b.

Figure 16:
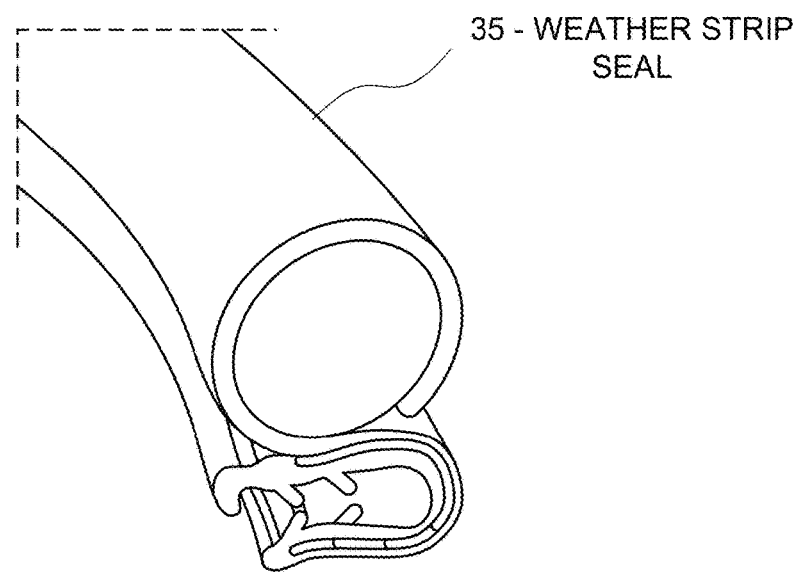
FIG. 16 is a representative perspective view of a weather stripping as illustrated in FIG. 15B.

FIG. 16 is a representative detailed view of the weather strip seal 35 described above.

Figure 17:
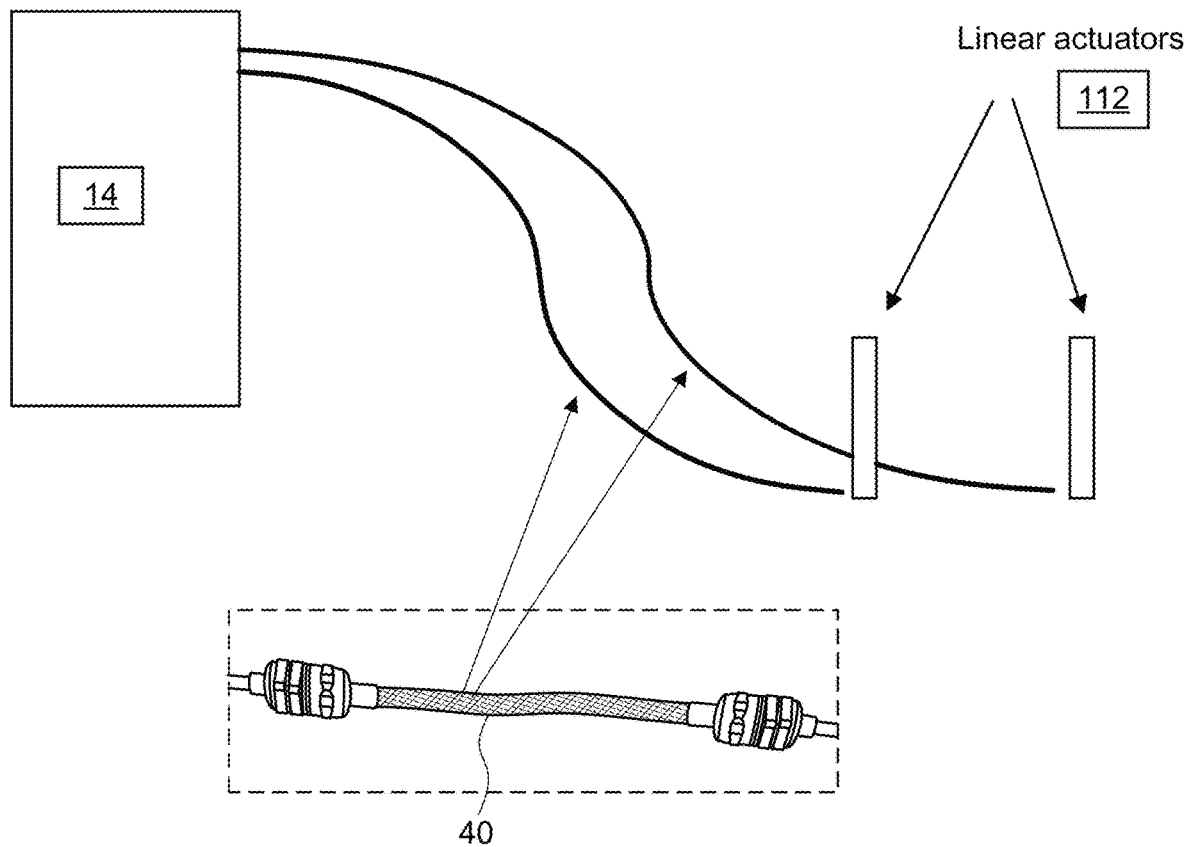
FIG. 17 is an illustrative representation of conduit or braided shielding used between the feeder control box and the access door linear actuator(s).

Referring now to FIG. 17, a representative graphic of the external wiring between the Control Box 14 and the Linear Actuators 112 is illustrated, where the shielded wiring is encased in protective 304 stainless steel conduit or braided sleeve 40 to further protect it from the elements and the possibility of damage due to rodents and/or antlers of aggressive target animals.

Figure 18:
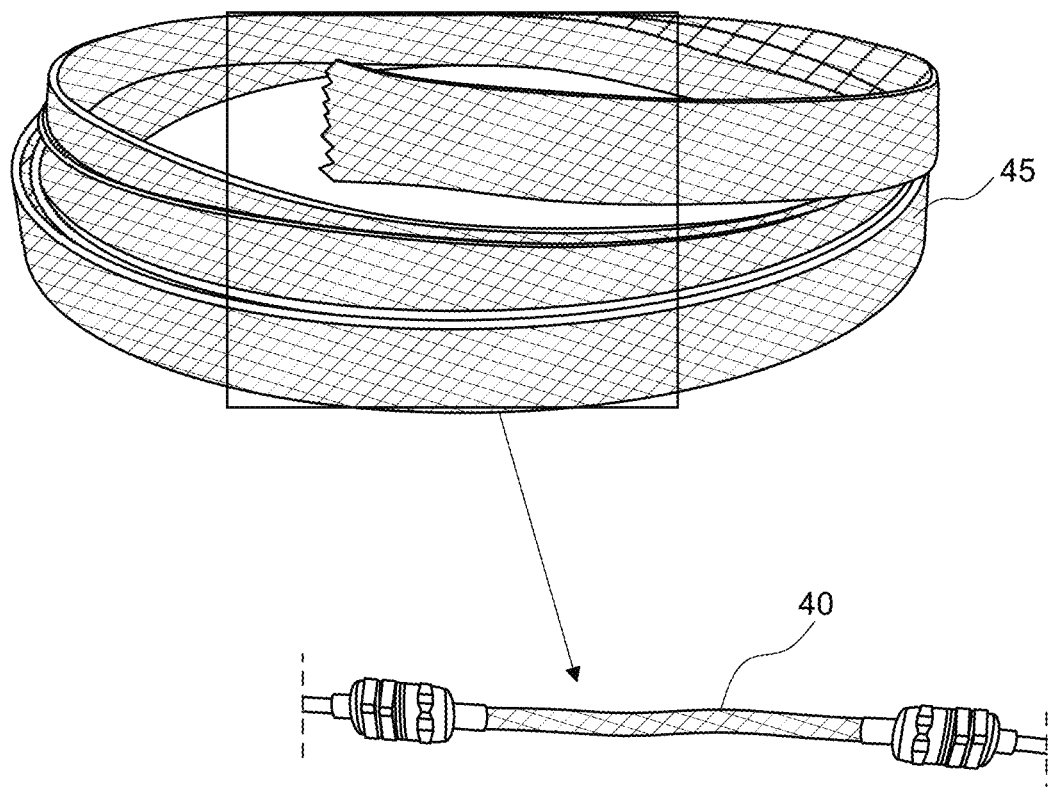
FIG. 18 is an illustrative representation of 304 Stainless Steel braided shielding described in FIG. 17, used to cover and protect the 2-Wire Cable, 14 AWG or 16 AWG used to make permanent inline connections in the electrical circuit and carry current to the external electrical components of the system.

FIG. 18 is a representative detail view of 304 stainless steel braided wiring sleeve shielding 45 described above, which can be placed over the external wiring. Alternatively, this 304 stainless steel braided wiring sleeve shielding 45 could be replaced with an equally or stronger) durable 304 stainless steel wiring conduit to serve the same purpose.

Figure 19:
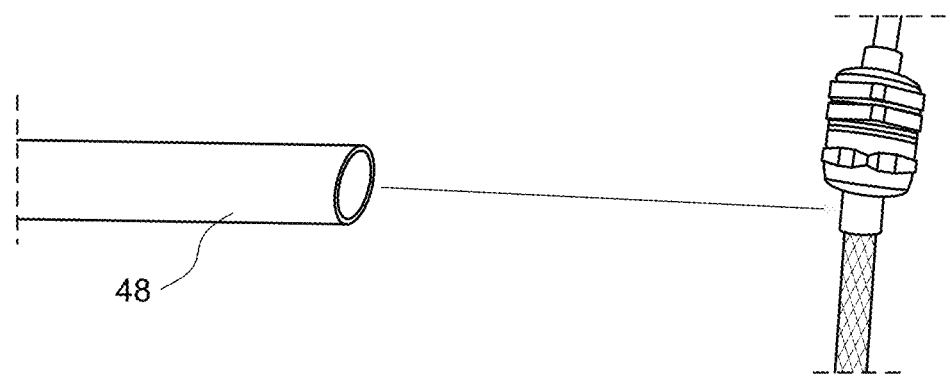
FIG. 19 is an illustrative representation of wire shielding comprising polyethylene shrink tubing used as an internal barrier to further protect and waterproof the 2-Wire Cable, 14 AWG or 16 AWG used to carry current to the external electrical components of the system inside of the conduit or braided shielding and cable glands.

Finally, referring now to FIG. 19, a representative detail view of a wiring connection end is illustrated, showing polyethylene shrink tubing 48 having an internal layer of thermoplastic adhesive, inserted over the 304 stainless steel braided wiring sleeve shielding 45 and within the cable gland. The polyethylene shrink tubing 48 having an internal layer of thermoplastic adhesive provides yet another protective weather seal and moisture barrier, both for the wire and the connections between the control box 14 and any external electrical components, such as the linear actuators 114.

As noted previously, in some embodiments, the multi-purpose, gravity-fed feeder system further comprises a noise maker (not shown) that activates when the feed access control door opens. The purpose of the noise maker is to attract deer in the area and make them curious to investigate the non-threatening sound(s) generated by the noise maker.

In some embodiments, the noise maker will generate one or more sounds for a period of time defined by a user. The noise maker can be pre-set by a user to generate these non-threatening sounds for a given period of time that a user feels is appropriate for the season, at a volume that the user feels is appropriate for the area.

In some embodiments, the noise maker is configurable to generate sounds that will attract deer, such as the sound of a corn feeder that uses a spinning plate to disperse corn on the ground being activated; a noise that most deer populations will instantly recognize.

Where permitted, additional sounds may also be generated by a noise maker or multiple noise makers fitted to the system. These sounds may vary during certain windows of time, such as during rutting season, and both in volume and duration and may include sounds commonly made by the deer themselves. Among the various sounds commonly heard in the whitetail deer population are:

the "estrus bleat": the sound a doe make when they're ready to mate;

the "breeding bellow"; a sound a doe makes when she's in the mood to mate;

the "tending grunt"; a grunt used by a buck chasing a doe. It's more common during the chaos of the pre-rut than the rut itself, when young bucks are still chasing does around since the mature bucks haven't stepped in to assert their dominance. It's a sound that tends to play on a buck's desire and gets them to come looking for the buck and doe making the sound.

"sparring deer sounds" (rattling); the rattles made by younger bucks' antlers when they're sparring or fighting, usually pre-rut. Bucks compete for does and territory by knocking their antlers together, and the sounds of a fight are very noticeable and intriguing to other deer;

"fighting deer sounds": (the sound of bucks actually fighting at the beginning of the rut), usually much louder and more violent than the sparring of the pre-rut. Aggressive rattling sounds are one of the best ways to attract other bucks since most will come to see what's going on. This is especially true of mature bucks who want to know who's fighting in their territory, who wins, and who's a threat. These aggressive rattling sounds are usually accompanied by other sounds such as buck grunts and snort wheeze sounds that a buck makes to assert his dominance.

As shown and described herein, the inventors have developed a multi-purpose, gravity-fed feeder system comprising a timed-access control system configured to provide a plurality of supplemental feed attractants to attract a target animal comprising certain windows of time, the time of the day, the number of times per day and the duration of the time when a feed attractant is made accessible. The feeder is designed to accept and provide a plurality of nutrient-rich feed attractants utilizing multiple, separable, gravity-fed feed storage hoppers in a single storage bin. The illustrated system comprises two feed access control door assemblies but may be provided with only one feed access control door assembly or more than two feed access control door assemblies. A timed-access control system comprises a linear actuator controller with LCD interface configured to make feed attractant accessible during hours when harvesting is legal, by activation of feed access control door assemblies with linear actuator push-pull arm assemblies attached to the feed access control door assemblies. The two or more push-pull arms assemblies are attached to actuator towers affixed to said feeder system and configured to hold said actuators and actuator push-pull arms. The separable gravity-fed feed storage bin hoppers are configurable for storing and dispensing a plurality of nutrient-rich feed attractant including protein-rich pellet feed, protein-rich whole grain feed, protein-rich plant feed, fortified cottonseed, Whole Cottonseed (WCS), dried corn kernels, field corn, milo seed, soybeans; or any combination thereof.

In some embodiments, the combination of nutrient-rich feed attractant further comprises protein-based compressed feed pellets and forage-based feed pellets wherein said nutrient-rich feed pellets further comprise minerals, vitamins, fats and salts.

To date, the inventors are not aware of any other combined multi-purpose feeders configured to simultaneously supply multiple supplemental feed attractants to target animals only during controlled periods of time, during daylight hours, when hunting is legal.

While preferred embodiments of the present system and apparatus have been shown and described herein, it will be obvious to those skilled in the art that such embodiments are provided by way of example only. Numerous variations, changes, and substitutions will now occur to those skilled in the art without departing from the system and apparatus. It should be understood that various alternatives to the embodiments of the system and apparatus described herein may be employed in practicing the system and apparatus. It is intended that the following claims define the scope of the system and apparatus and that methods and structures within the scope of these claims and their equivalents be covered thereby.

What is claimed is:

1. An improved multi-purpose gravity-fed feeder system configured to provide nutrient-rich feed attractant to a target animal at a feeder site during specific hours, said multi-purpose, gravity-fed feeder system comprising:
    a gravity-fed feed storage bin;
    at least one feed access control door assembly;
    at least one feed metering device to control or restrict feed flow;
    an actuator controller;
    at least one linear actuator;
    at least one actuator push-pull arm;
    an actuator tower;
    an assembly mount for attachment to the gravity-fed storage bin;
        wherein the actuator controller comprises and provides configuration settings to provide limit position adjustments, speed control and speed synchronization for the linear actuators, and
        wherein the at least one feed access control door assembly is configured to slide vertically up the side of the feed storage bin along door ramps integrated into side metering mesh screens to expose a horizontal feed tray under the sliding door,
    a timed-access control system mounted in a control box, comprising:
        a controller housing with a LCD touchscreen interface comprising;
            an actuator controller PCB, comprising;
                multiple internal digital relays;
                multiple 3-wire or 4-wire feedback signal actuators;
                a power indicator;
                an internal timer control; and
                actuator feedback indicators;
        wherein the LCD touchscreen interface provides for operator programmable input,
        wherein the multiple internal digital relays are configured to trigger multiple actuator controllers,
        wherein the internal timer control is configurable for activating the actuator controllers for seasonal windows of time, meteorological windows of time, or specified durations of time; and
        wherein the internal timer control provides for interval modes with customizable delay times for actuating the actuators.

2. The improved multi-purpose gravity-fed feeder system of claim 1, further comprising:
    a second feed access control door assembly;
    an internal power supply comprising:
        at least one rechargeable battery;
    a solar panel electrically connected to the at least one rechargeable battery; and
    a solar panel charge controller electrically connected to the solar panel;
        wherein said solar panel is configured to maintain and recharge the at least one rechargeable battery, and
        wherein said solar panel charge controller is configured to control the amount and rate of charge to the primary rechargeable battery.

3. The improved multi-purpose gravity-fed feeder system of claim 1, wherein the actuator controller PCB, provides for speed adjustments for extension and retraction of the at least one linear actuator.

4. The improved multi-purpose gravity-fed feeder system of claim 1, wherein the internal timer control provides for at least four program times within a 24 hour period.

5. The improved multi-purpose gravity-fed feeder system of claim 1, wherein the control box is weather resistant and comprises:
    internal lighting;
    weather seals for an entry door and a vent;
    cable glands around external wiring ports; and
    at least 14G insulated and shielded wiring for power.

6. The improved multi-purpose gravity-fed feeder system of claim 1, wherein the at least one feed access control door assembly further comprises weather stripping around a top edge of the access door to seal out moisture and protect the feed attractant inside the feeder from moisture penetration.

7. The improved multi-purpose gravity-fed feeder system of claim 1, further comprising:
    external moisture or rain diverters around a top or lid of the feeder system to divert rain, overnight condensation, or snow away from a feed attractant storage bin in the gravity-fed feeder system.

8. The improved multi-purpose gravity-fed feeder system of claim 1, further comprising:
    external wiring conduit or braided sleeve to protect control wiring between the control box and the at least one linear actuator from rodents and/or antlers of target animals.

9. The improved multi-purpose gravity-fed feeder system of claim 8, wherein the control wiring further comprises wire shielding comprising polyethylene shrink tubing having:
    an internal layer of thermoplastic adhesive;
    a temperature rating between at least −40° C. and +125° C.;
    a working voltage rating up to at least 440 Volts; and
    chemical resistance to aqueous salt solutions, oils, gasoline, diesel fuel, simple alcohol solutions, strong base solutions, diluted inorganic acid solutions, bleach solutions, and diluted peroxide solutions.

10. The improved multi-purpose gravity-fed feeder system of claim 8, wherein the external wiring conduit or braided sleeve comprises stainless steel.

11. The improved multi-purpose gravity-fed feeder system of claim 10, wherein the external wiring conduit or braided sleeve comprises 304 stainless steel.

* * * * *